(12) United States Patent
Ito et al.

(10) Patent No.: US 8,416,459 B2
(45) Date of Patent: Apr. 9, 2013

(54) IMAGE PROCESSING APPARATUS, IMAGE PROCESSING METHOD, PROGRAM, RECORDING MEDIUM, PRINTING SYSTEM, IMAGE FORMING APPARATUS

(75) Inventors: Takayuki Ito, Kanagawa (JP); Yoshihisa Ohta, Tokyo (JP); Masakazu Yoshida, Kanagawa (JP); Takashi Kimura, Kanagawa (JP); Masanori Hirano, Kanagawa (JP); Naoki Nakano, Kanagawa (JP); Shinichi Hatanaka, Kanagawa (JP); Yoshiaki Hoshino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/061,718

(22) PCT Filed: Sep. 9, 2009

(86) PCT No.: PCT/JP2009/066054
§ 371 (c)(1),
(2), (4) Date: Mar. 2, 2011

(87) PCT Pub. No.: WO2010/030030
PCT Pub. Date: Mar. 18, 2010

(65) Prior Publication Data
US 2011/0170142 A1 Jul. 14, 2011

(30) Foreign Application Priority Data

Sep. 13, 2008 (JP) ................................. 2008-235779
Aug. 1, 2009 (JP) ................................. 2009-180241

(51) Int. Cl.
*H04N 1/40* (2006.01)
(52) U.S. Cl.
USPC ........................... 358/3.24; 358/1.9; 358/518
(58) Field of Classification Search ................. 358/3.24, 358/1.9, 518
See application file for complete search history.

(56) References Cited

U.S. PATENT DOCUMENTS

2003/0132984 A1 7/2003 Maltz
2006/0056683 A1 3/2006 Komatsu
(Continued)

FOREIGN PATENT DOCUMENTS

JP 9 216419 8/1997
JP 3268712 3/2002
(Continued)

OTHER PUBLICATIONS

International Search Report issued Oct. 27, 2009 in PCT/JP09/066054 filed Sep. 9, 2009.

(Continued)

*Primary Examiner* — Twyler Haskins
*Assistant Examiner* — Michael Burleson
(74) *Attorney, Agent, or Firm* — Oblon, Spivak, McClelland, Maier & Neustadt, L.L.P.

(57) ABSTRACT

An image processing apparatus for converting input image data into output image data for an image forming apparatus configured to output an image with the use of coloring material, which includes a unit configured to perform a coloring-material usage amount reduction process of converting the input image data into the output image data such that an amount of the coloring material used for color-printing the input image data becomes a target coloring-material usage amount defined based on a monochrome-printing coloring-material usage amount required for monochrome-printing the input image data.

12 Claims, 18 Drawing Sheets

U.S. PATENT DOCUMENTS

| | | |
|---|---|---|
| 2006/0203269 A1* | 9/2006 | Murayama ............... 358/1.9 |
| 2006/0232799 A1* | 10/2006 | Nakatani et al. ........... 358/1.9 |
| 2006/0290731 A1 | 12/2006 | Ishii et al. |
| 2007/0253039 A1* | 11/2007 | Ariga ..................... 358/518 |
| 2009/0018881 A1 | 1/2009 | Ito et al. |

FOREIGN PATENT DOCUMENTS

| | | |
|---|---|---|
| JP | 2004 274476 | 9/2004 |
| JP | 2005 121991 | 5/2005 |
| JP | 2006 68982 | 3/2006 |
| JP | 2006 82251 | 3/2006 |
| JP | 3815465 | 8/2006 |
| JP | 2006 270927 | 10/2006 |
| JP | 2007 50708 | 3/2007 |
| JP | 3937977 | 6/2007 |
| JP | 2008 132665 | 6/2008 |

OTHER PUBLICATIONS

Extended European Search Report issued Mar. 5, 2012, in Patent Application No. 09813173.3.

* cited by examiner

IMAGE PROCESSING APPARATUS, IMAGE PROCESSING METHOD, PROGRAM, RECORDING MEDIUM, PRINTING SYSTEM, IMAGE FORMING APPARATUS

TECHNICAL FIELD

The present invention relates to an image processing apparatus, an image processing method, a program, a recording medium, a printing system, and an image forming apparatus.

BACKGROUND ART

Generally, an image processing apparatus for processing image data (for example, a personal computer or a workstation) can create various documents including characters, graphics, and images, with the use of application software. An image forming apparatus such as a printer, a fax machine, a copier, and a multifunction peripheral having functions of a printer/a fax machine/a copier, can form and output such documents as images by performing an image forming method such as an inkjet recording method or an electrophotographic method. In the image forming method, coloring material (image forming material) such as toner and ink is used to form ("record" and "print" may be used as synonyms) images.

When image forming apparatuses used in offices are used for outputting images, not only is the image quality of the printed images important, but printing costs are also important. In monochrome printing, the image forming apparatus basically uses a coloring material of only one color K (black). However, in color printing, the image forming apparatus uses coloring materials of four colors CMYK (or more than four colors when a special color is used). When outputting (expressing) a color image, the coloring materials may not always be used separately; plural coloring materials may be superposed in the same place to express various hues. Therefore, the cost required for color printing may amount to several times that of monochrome printing, according to a simple calculation.

Thus, an image forming apparatus usually has a printing mode (referred to as a "coloring-material usage amount reduction mode"; also referred to as an econo-mode, an ink-saving mode, a save mode, etc.) in which the amount of coloring materials used for printing out color images is reduced compared to the case of a regular mode. By having such a printing mode, costs for printing can be reduced.

For example, patent document 1 describes a process of setting a target for saving the usage amount of image forming materials based on specified conditions, and changing the color reproduction conditions with respect to the input color information based on the set target. For example, the color reproduction conditions are changed by changing the γ values of the color space, changing the color area compression conditions, or changing the directions of compressing the color areas.

Furthermore, patent document 2 describes a thinning-out process performed on printing data with the use of specific patterns. Patent document 3 describes a process of reducing gradations at a fixed rate with respect to input data. Patent document 4 describes a process of reducing the coloring-material usage amount to a predetermined amount, by reducing densities of objects (elements for forming images) in a descending order in terms of the coloring material consumption amounts of the objects (in a manner such that the outlines are darker than the inner areas). Patent document 5 describes a process of reducing the coloring-material usage amount when a coloring-material reduction mode is selected, by compressing gradation properties at a fixed rate. Patent document 6 describes a process of reducing the coloring-material usage amount when a coloring-material reduction mode is selected, by printing images in black to be as dark as those in a regular mode, and printing images in colors other than black to be lighter than those in a regular mode.

Patent Document 1: Japanese Laid-Open Patent Application No. 2006-68982

Patent Document 2: Japanese Laid-Open Patent Application No. 2006-270927

Patent Document 3: Japanese Laid-Open Patent Application No. H09-216419

Patent Document 4: Japanese Patent No. 3268712

Patent Document 5: Japanese Laid-Open Patent Application No. 2008-132665

Patent Document 6: Japanese Laid-Open Patent Application No. 2007-50708

However, in the above-described conventional technologies, the reduction amount of coloring material is not clear, and the image quality and the cost are not balanced. For example, when the coloring-material usage amount is reduced too much as a result of placing importance on cost, the entire image will have a light, blurry quality. Thus, the image will lack the intended sharpness of a color image. Conversely, if too much importance is placed on image quality, the amount of coloring material used cannot be sufficiently reduced.

As described above, in the conventional technology, the image quality may decline (due to less visible colors) as a result of reducing the coloring-material usage amount.

DISCLOSURE OF INVENTION

The present invention has been made in light of the above problems and may reduce the costs of coloring materials while maintaining a balance of hues.

According to an aspect of the present invention, there is provided an image processing apparatus for converting input image data into output image data for an image forming apparatus configured to output an image with the use of coloring material, the image processing apparatus including a unit configured to perform a coloring-material usage amount reduction process of converting the input image data into the output image data such that an amount of the coloring material used for color-printing the input image data becomes a target coloring-material usage amount defined based on a monochrome-printing coloring-material usage amount required for monochrome-printing the input image data.

According to an aspect of the present invention, there is provided an image processing method for converting input image data into output image data for an image forming apparatus configured to output an image with the use of coloring material, the image processing method including a step of performing a coloring-material usage amount reduction process of converting the input image data into the output image data such that an amount of the coloring material used for color-printing the input image data becomes a target coloring-material usage amount defined based on a monochrome-printing coloring-material usage amount required for monochrome-printing the input image data.

According to an aspect of the present invention, there is provided a program including instructions for causing a computer to execute a process of converting input image data into output image data for an image forming apparatus configured to output an image with the use of coloring material, the process including a step of performing a coloring-material usage amount reduction process of converting the input image data into the output image data such that an amount of the coloring material used for color-printing the input image data becomes a target coloring-material usage amount defined based on a monochrome-printing coloring-material usage amount required for monochrome-printing the input image data.

According to an aspect of the present invention, there is provided an image forming apparatus for outputting an image with the use of coloring material in accordance with input image data, including a unit configured to perform a coloring-material usage amount reduction process of converting the input image data into the output image data such that an amount of the coloring material used for color-printing the input image data becomes a target coloring-material usage amount defined based on a monochrome-printing coloring-material usage amount required for monochrome-printing the input image data.

With this configuration, the costs of coloring materials can be reduced while maintaining a balance of hues.

BEST MODE FOR CARRYING OUT THE INVENTION

Figure 1:
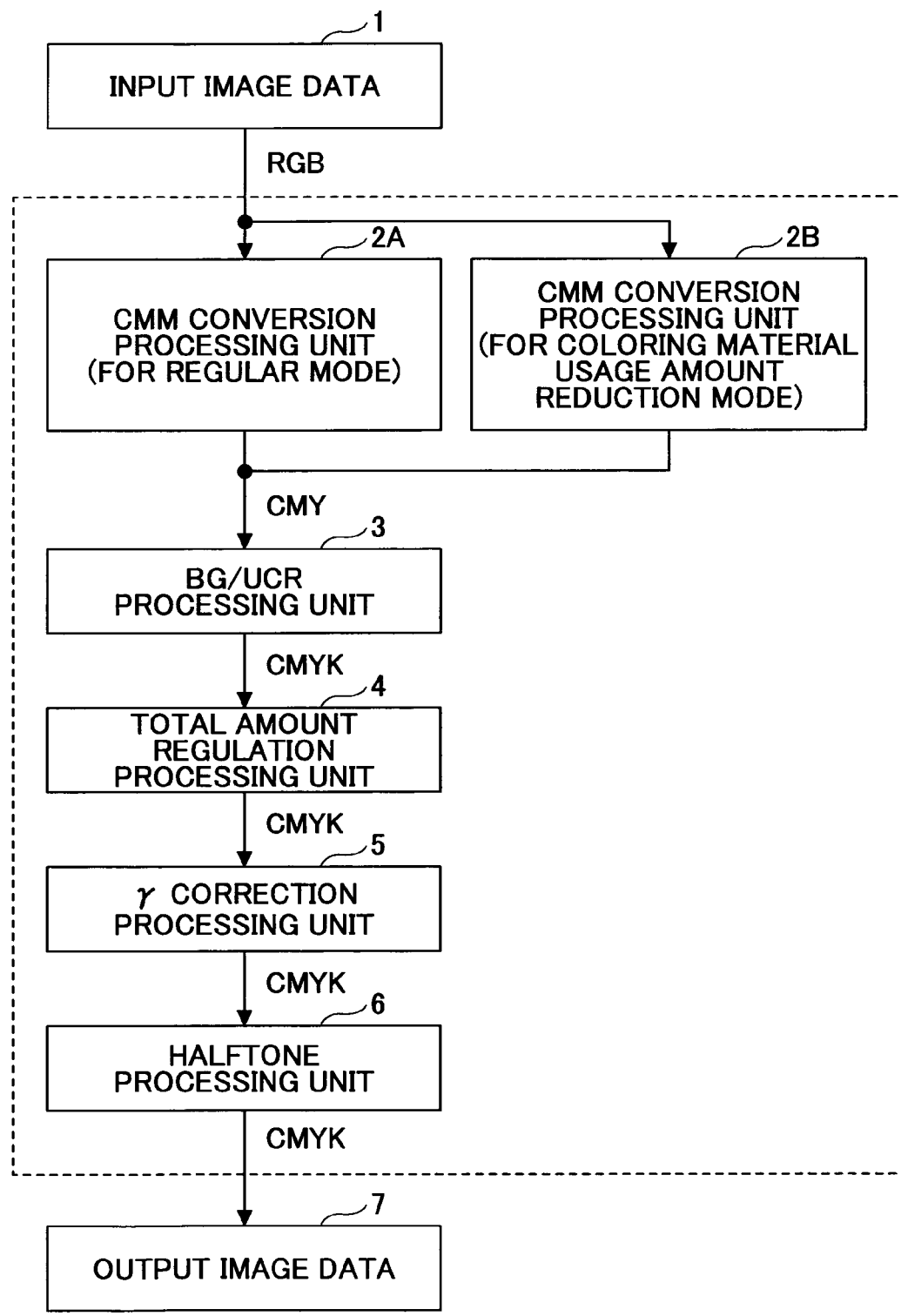
FIG. 1 is a functional block diagram of a first example of an image processing apparatus according to an embodiment of the present invention.

Embodiments of the present invention are described below with reference to the accompanying drawings. FIG. 1 is a functional block diagram of an image processing apparatus according to an embodiment of the present invention for performing an image processing method according to an embodiment of the present invention.

The image processing apparatus converts input image data 1 received from application software into output image data 7 with the use of a BG/UCR (black generation/Under Color Removal) processing unit 3, a total amount regulation processing unit 4, a γ correction processing unit 5, and a halftone processing unit 6. The BG/UCR processing unit 3 performs black generation and Under Color Removal based on CMY values and input from CMM (Color Management Module) conversion processing units 2A and 2B for converting a color space of a monitor display to a color space of a storage device (image forming apparatus) (RGB color system→CMY color system). The total amount regulation processing unit 4 corrects CMYK signals according to the maximum total amount of coloring materials with which the image forming apparatus can form images based on CMYK signals serving as recording control signals. The γ correction processing unit 5 performs input output correction in line with properties of the image forming apparatus and the user's preferences. The halftone processing unit 6 replaces gradation data with a dot pattern arrangement. These processing units 2A and 2B, 3 through 6 are constituted by programs.

The CMM conversion processing unit 2A performs CMM conversion in a regular mode where a coloring-material usage amount reduction process is not performed (input image is directly reproduced). The CMM conversion processing unit 2B performs a coloring-material usage amount reduction process according to an embodiment of the present invention. Specifically, when an input image is to be color-printed and a coloring-material usage amount reduction mode has been specified for using a reduced amount of coloring materials compared to the case of a regular mode, the CMM conversion processing unit 2B performs a process of converting the input RGB data into CMY (or CMYK) data which uses a reduced amount of coloring materials, by using a coloring-material usage amount reduction CMM conversion look-up table (LCT).

Figure 2:
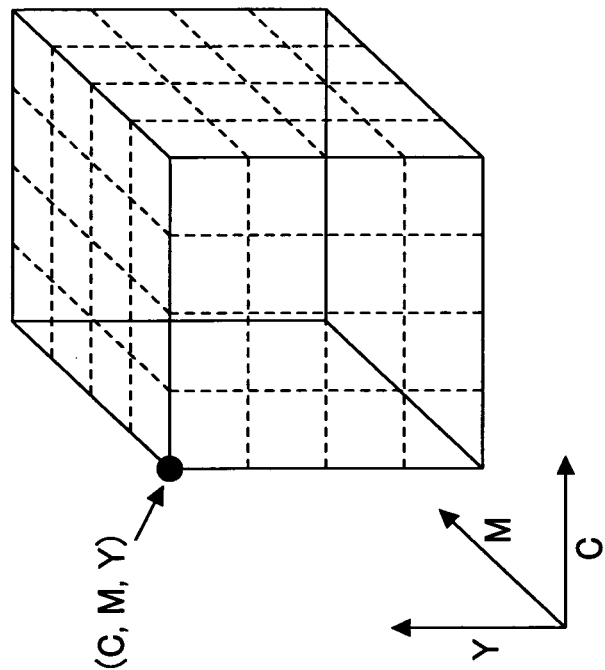
FIG. 2 illustrates a CMM conversion process.
Figure 2:
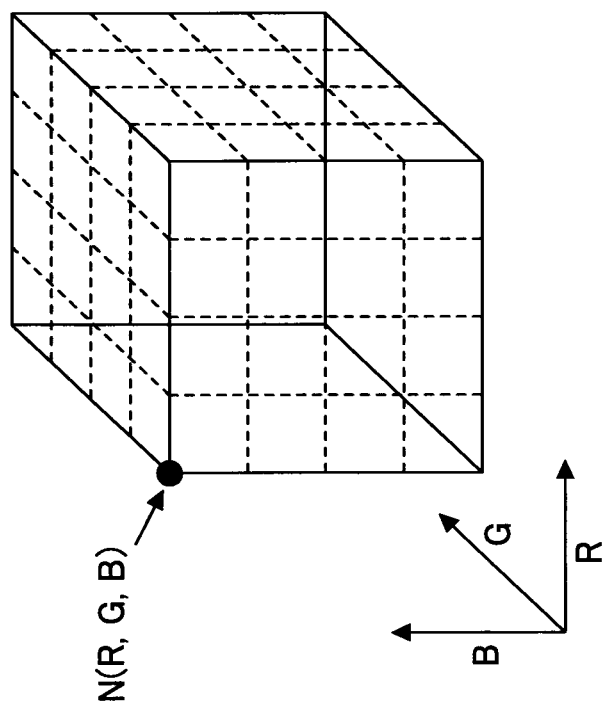

That is, the coloring-material usage amount reduction process unit according to an embodiment of the present invention executes the coloring-material usage amount reduction mode by performing the above-described CMM conversion process. In the CMM conversion process, a three-dimensional LUT (look-up table) as shown in FIG. 2 is used to convert the RGB components of the input colors into CMY components that correspond to the RGB components on a one-on-one manner. Thus, separate settings can be specified for each of the input colors, and an appropriate process for adjusting the coloring-material usage amount for each of the colors can be performed.

Conversion values (CMY values or CMYK values) corresponding to target coloring-material usage amounts defined as references of the coloring-material usage amounts used for monochrome printing, are input in the LUT to be used by the CMM conversion processing unit 2B. The coloring-material usage amount reduction process is also performed on the input image data, along with the CMM conversion process. Specifically, the input image data is converted such that the coloring-material usage amount for color-printing the input image corresponds to the target coloring-material usage amount defined based on the coloring-material usage amount required for monochrome-printing the input image. This LUT is referred to as a "coloring-material usage amount reduction CMM conversion LUT".

In the above-described coloring-material usage amount reduction process, a process is performed for converting the input image data such that the coloring-material usage amount for color-printing the input image corresponds to the target coloring-material usage amount defined based on the coloring-material usage amount required for monochrome-printing the input image. In this case, the target coloring-material usage amount is defined by using as a reference the coloring-material usage amount used when only a K (black) coloring material is used for the printing, because typically only one type of coloring material K (black) is used in monochrome printing. However, in a case where the image data is output to an image forming apparatus in which plural types of coloring materials are used to express black, the total usage amount of the coloring materials corresponds to this coloring-material usage amount for monochrome printing (reference usage amount).

Figure 3:
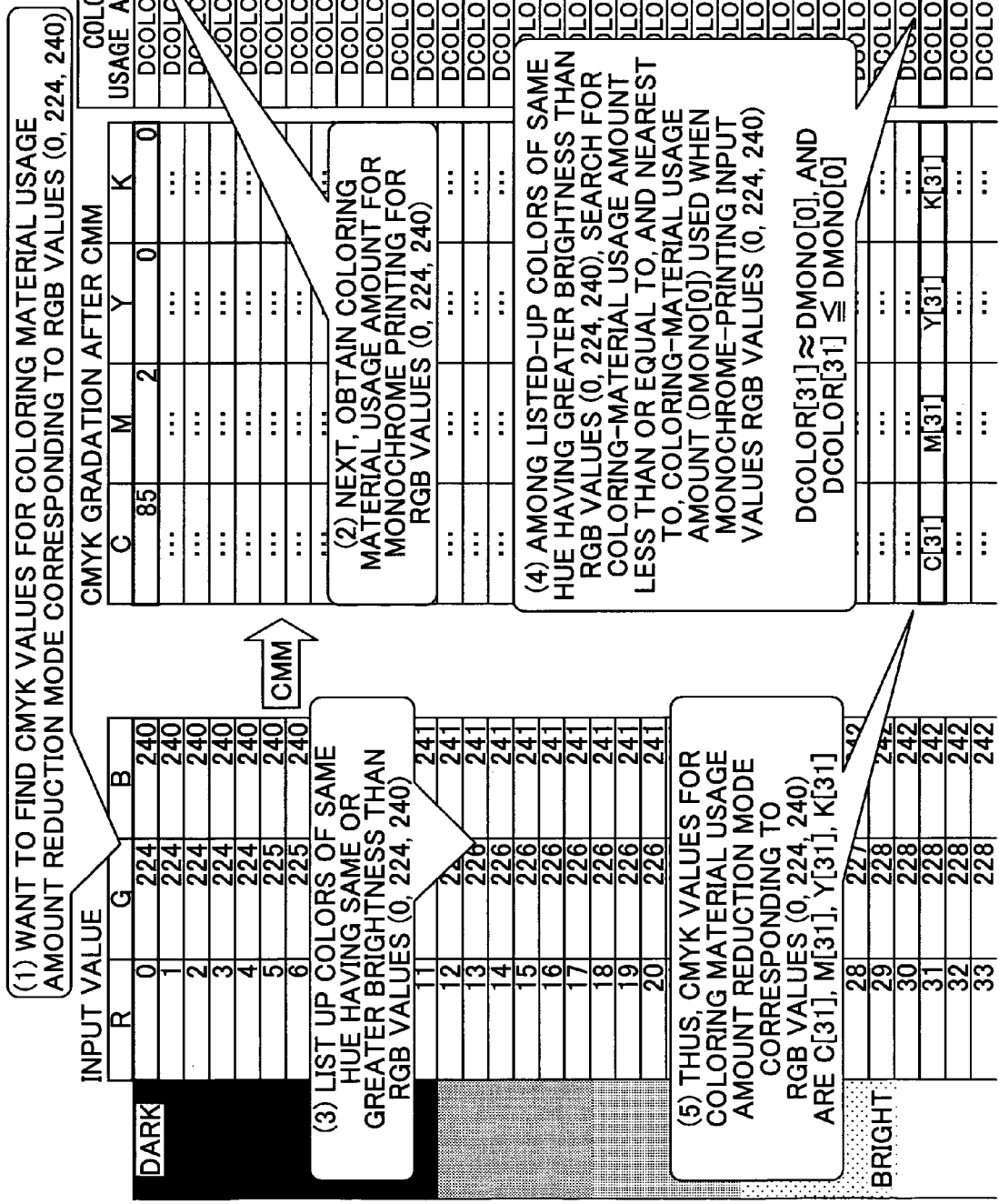
FIG. 3 illustrates a procedure of creating an LUT used in a CMM conversion process including a coloring material usage amount reduction process.

A description is given, with reference to FIG. 3, of the procedure of creating the coloring-material usage amount reduction CMM conversion LUT used by the CMM conversion processing unit 2B for performing the process of converting data to reduce the coloring-material usage amount.

First, the coloring-material usage amount is obtained (DMONO[0] in the example shown in FIG. 3) for a case of monochrome-printing (monochrome conversion) predetermined input values (RGB values: input image data of R=0, G=224, B=240 in the example shown in FIG. 3) (procedures (1) and (2) in FIG. 3).

Next, colors of the same hue having the same or greater brightness than the input values (R=0, G=224, B=240) are listed up (procedure (3) in FIG. 3). In this procedure, the colors of the hue are listed up based on the CMM conversion LUT used in a regular mode (mode in which the coloring-material usage amount is not reduced).

Next, the coloring-material usage amounts of the listed-up colors of the same hue having the same or greater brightness than the input values, are listed up (usage amounts for color printing: DCOLOR[*]). The CMM conversion processing unit 2B searches for the coloring-material usage amount that is less than or equal to, and nearest to, the coloring-material usage amount (DMONO[0]) used when monochrome-printing the input values (procedure (4) in FIG. 3). That is, the CMM conversion processing unit 2B searches for a conversion condition by which the coloring-material usage amount becomes less than or equal to a monochrome conversion coloring material amount of the input values (DMONO[0] in the example shown in FIG. 3) (in FIG. 3, DCOLOR[31] corresponds to the coloring-material usage amount for color printing that satisfies this condition).

Then, the search-found conversion conditions (C[31], M[31], Y[31], and K[31] in the example shown in FIG. 3) are used as the color conversion values in the coloring-material usage amount reduction mode (procedure (5) in FIG. 3).

By obtaining such a condition for each input value, a coloring-material usage amount reduction CMM conversion LUT can be created.

The CMM conversion processing unit 2B performs a CMM conversion process with the use of a coloring-material usage amount reduction CMM conversion LUT, when there is a specification for reducing the usage amount of coloring materials used for color-printing the input image data, i.e., when a coloring-material usage amount reduction mode is specified. Accordingly, when the CMM conversion process is performed (conversion from RGB color space to CMY color space), the input image data is converted such that the coloring-material usage amount for color-printing the input image corresponds to the target coloring-material usage amount defined based on the coloring-material usage amount required for monochrome-printing the input image.

As described above, by performing the coloring-material usage amount reduction process of converting the input image data such that the coloring-material usage amount for color-printing the input image corresponds to the target coloring-material usage amount defined based on the coloring-material usage amount required for monochrome-printing the input image, the costs of coloring materials can be reduced while maintaining a balance of hues.

Next, a description is given of another example of the target coloring-material usage amount. In the above example, the coloring-material usage amount for monochrome-printing is the target coloring-material usage amount. However, the target coloring-material usage amount can be a value obtained by using the coloring-material usage amount for monochrome-printing as a reference usage amount, and multiplying this reference usage amount by a coefficient "s" (s=0% through 100%) defined in advance.

When the cost of the coloring material varies according to ingredients in the coloring material, the cost of a black coloring material may not be the same as the cost of a coloring material of a color other than black. In this case, the cost is calculated based on the coloring-material usage amount; a combination of coloring material amounts is selected, whereby the selected combination corresponds to a cost that is less than or equal to that of monochrome printing; and the selected combination of coloring material amounts is used as the target coloring-material usage amount.

The cost is calculated by multiplying the actual physical amount of coloring-material per unit area required for expressing color data, by the coloring material cost per unit area. Information of the coloring material cost per unit area may be acquired by recording it in advance in a recording material accommodating member such as an ink cartridge or a toner cartridge, or a liquid jetting head (recording head) that is integrated with an ink cartridge. Furthermore, by acquiring model information from a liquid jetting head (recording head) that is integrated with an ink cartridge, the cost information may be set based on the model information.

A description is given of monochrome conversion of input image data.

The following NTSC (National Television Standards Committee) conversion formula is typically used as the conversion formula used in monochrome conversion.

$$K=(R*306+G*601+B*117)/1024$$

With the NTSC conversion formula, an input RGB value is multiplied by a coefficient corresponding to visual properties of a human being, and the obtained value is output as data for K. Even when a maximum value is output, a color having a high degree of brightness such as yellow is processed as a very light grey, and a color having a low degree of brightness such as blue is processed as a dark grey.

Figure 4:
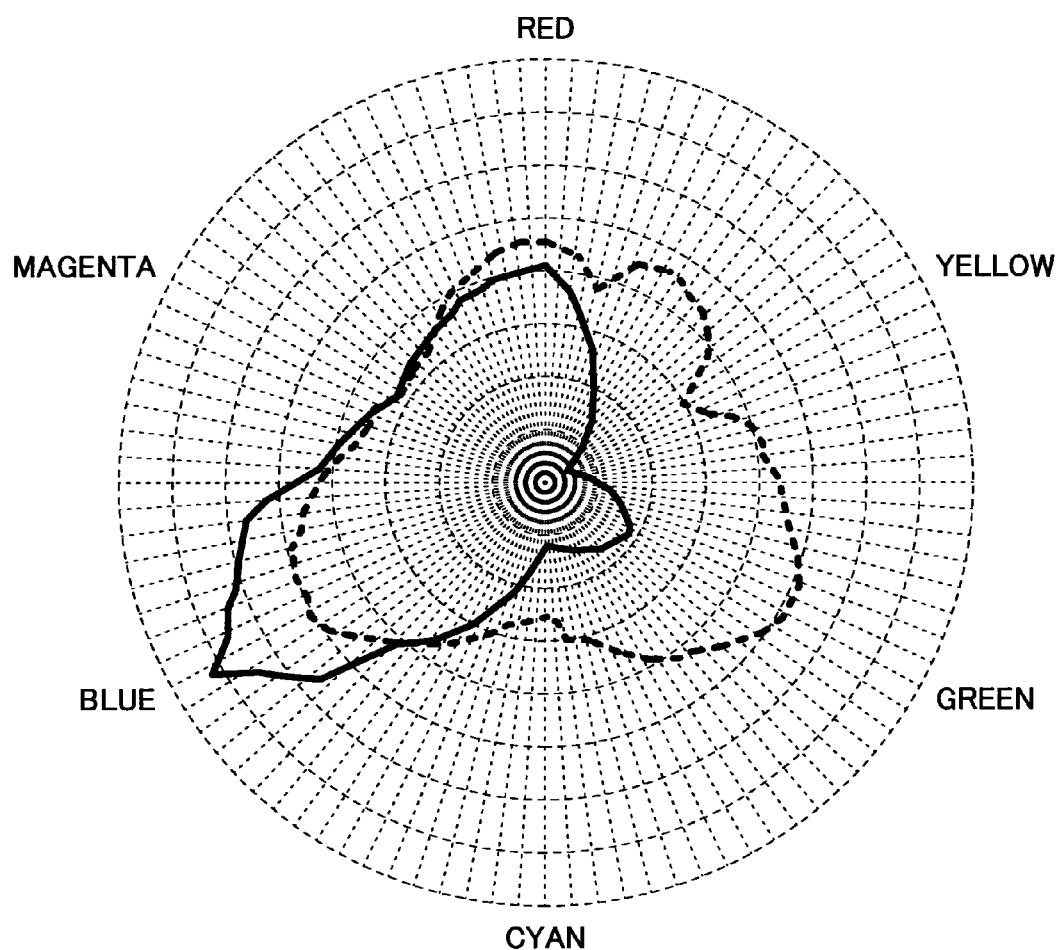
FIG. 4 illustrates an example of coloring-material usage amounts in NTSC conversion and uniform coefficient conversion performed for monochrome conversion.

FIG. 4 illustrates an example of coloring-material usage amounts for each hue when NTSC conversion is performed. FIG. 4 also shows a comparative example, where the coloring-material usage amounts are obtained by multiplying each hue by a simple coefficient (for example, 0.5). As shown in FIG. 4, in the case of NTSC conversion, the coloring-material usage amounts are very different depending on the hue. Accordingly, when performing a process of reducing the coloring-material usage amount to that of monochrome-printing, the coloring-material usage amount can be reduced significantly for an image including a large amount of colors near yellow. However, the coloring-material usage amount cannot be reduced as much in an image including a large amount of colors near blue.

The above-described coloring-material usage amount reduction process of reducing the coloring-material usage amount to the same amount as that of monochrome-printing is preferably applied to predetermined color data. The predetermined color data is data of a color whose visibility does not decline significantly as a result of performing the above-described coloring-material usage amount reduction process. The degree of visibility is related to the level of the coloring-material usage amount required for expressing the color data. The brightness of the color data when converted into data for monochrome-printing, is a significant factor in determining the visibility. For example, as described above, the brightness of yellow is high, and consequently the coloring-material usage amount decreases, which lowers the visibility.

The visibility of particular colors can be prevented from declining by performing different processes depending on the color data. For example, for predetermined color data, the process of reducing the coloring-material usage amount to the same amount as that of monochrome-printing may be performed (reducing the coloring-material usage amount for color-printing). Meanwhile, for other color data, the coloring-material usage amount may be increased compared to the case of monochrome-printing.

The predetermined color data can be determined based on NTSC conversion. The input RGB values with which the K data can be reduced (i.e., a dark color) is used as the predetermined color data.

In this case, the predetermined color data may vary depending on properties of the image forming apparatus used for outputting output image data and the user's preference. Furthermore, in consideration of visual properties of the human being, not only the brightness, but also the chromaticity and the hue are also related to visibility. Therefore, the predetermined color data, i.e., the color data on which the conversion process for coloring-material usage amount reduction is to be performed, may be determined based on factors such as chromaticity and the hue (i.e., any one of the level of brightness, the level of chromaticity, and whether the color belongs to a hue of a wide dynamic range). Accordingly, images having high visibility can be achieved.

The above description is given with respect to color data of input RGB values. However, the predetermined color data may be determined based on the brightness, the chromaticity, or the hue of CMYK data obtained as a result of a CMM conversion process, or a color image actually recorded on a recording medium by the image forming apparatus.

Meanwhile, the visibility of the color data other than the predetermined color data declines as a result of the coloring-material usage amount reduction process. Accordingly, for the color data other than the predetermined color data, the coloring-material usage amount is set to range between the coloring-material usage amount for monochrome-printing and the coloring-material usage amount for color-printing. When importance is placed on the visibility, the amount is set closer to that for color-printing. When importance is placed on reducing the coloring material, the amount is set closer to that for monochrome-printing.

Different target coloring-material usage amounts are defined for the predetermined color data and the color data other than the predetermined color data. Furthermore, the above-described LUT is created based on CMYK values obtained as a result of the CMM conversion process. Accordingly, the predetermined color data can be converted such that the coloring-material usage amount for color-printing the input image corresponds to the target coloring-material usage amount defined based on the coloring-material usage amount (or coloring material cost) required for monochrome-printing the input image. Furthermore, the color data other than the predetermined color data can be converted to achieve the target coloring-material usage amount appropriate for the corresponding color.

Different target coloring-material usage amounts can be defined for the predetermined color data and the color data other than the predetermined color data by using different coefficient "s" values to be multiplied by the reference usage amount. Furthermore, when different target coloring-material usage amounts are defined for the predetermined color data and the color data other than the predetermined color data, the coloring-material usage amount may not be reduced for the color data other than the predetermined color data.

Figure 5:
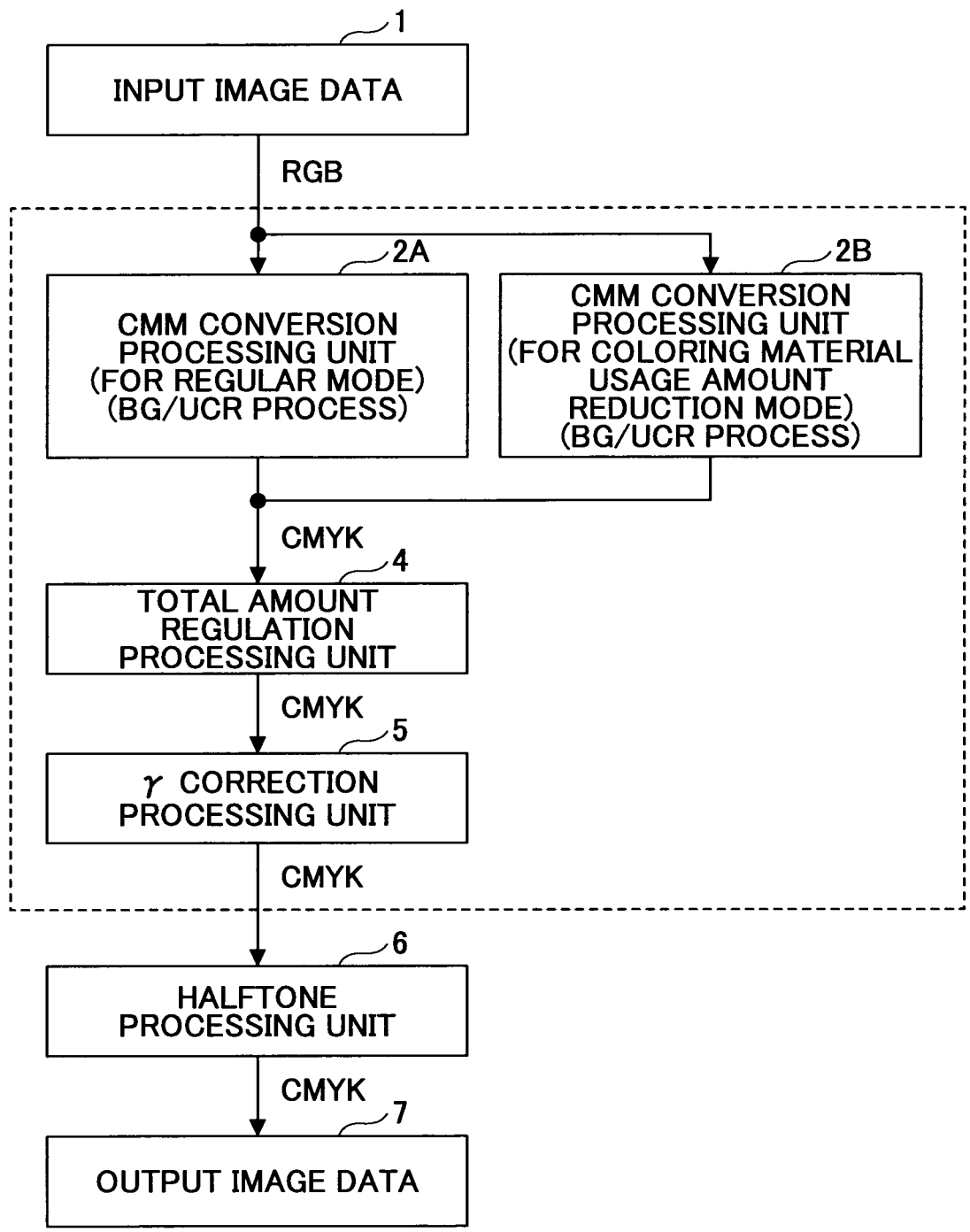
FIG. 5 is a functional block diagram of a second example of an image processing apparatus according to an embodiment of the present invention.

In the above description, the coloring-material usage amount reduction process is performed with the use of an LUT of the CMM conversion processing unit 2B. However, as shown in FIG. 5, the CMM conversion process and the BG/UCR process can be directly integrated by using values of a three-dimensional LUT used for the CMM conversion process (convert from RGB values to CMYK values). This CMM conversion processing unit 2B in which the processes are integrated may also be used to perform the coloring-material usage amount reduction process.

The coloring-material usage amount reduction process may not only be executed along with the conversion from RGB values to CMY values or the conversion from RGB values to KCMY values, but may be executed along with the conversion from RGB values to KCMYRGB values or conversion of other color values (e.g., of multiple color types).

Figure 6:
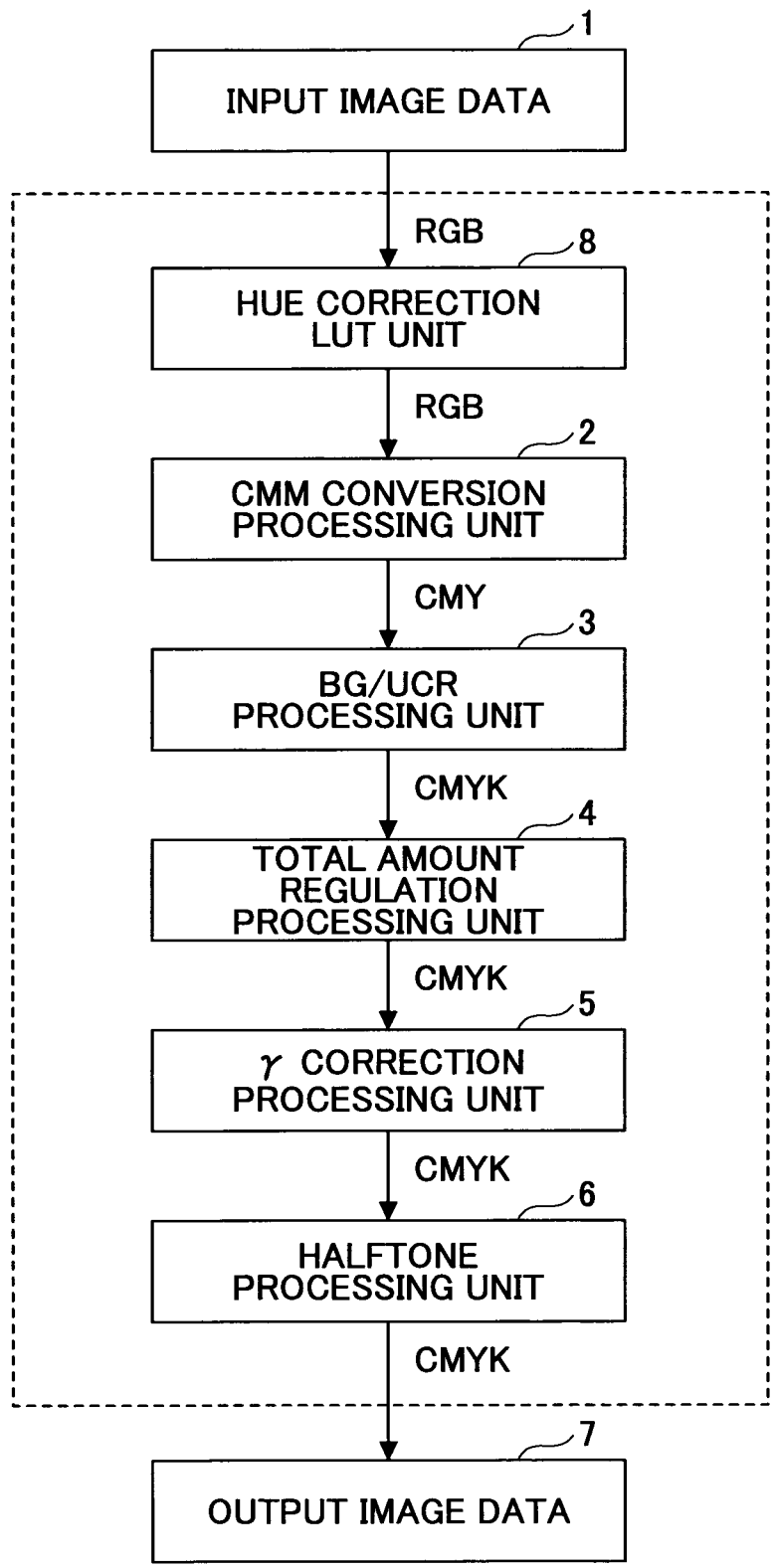
FIG. 6 is a functional block diagram of a third example of an image processing apparatus according to an embodiment of the present invention.
Figure 7:
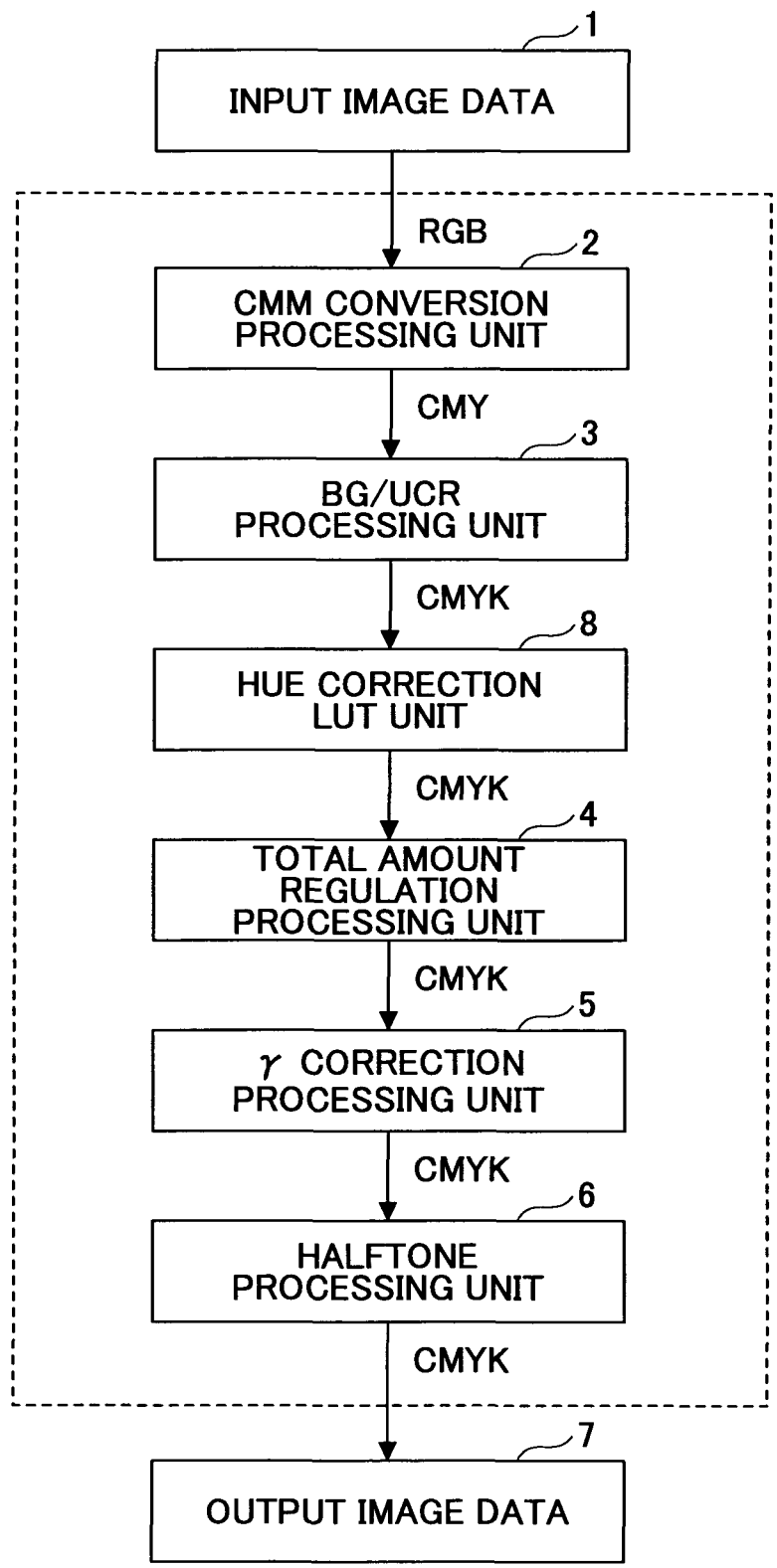
FIG. 7 is a functional block diagram of a fourth example of an image processing apparatus according to an embodiment of the present invention.

Similarly, as shown in FIGS. 6 and 7, a hue correction LUT unit 8 may be provided for a pre-process of the CMM conversion processing unit 2 or a post-process of the BG/UCR processing unit 3. The hue correction LUT unit 8 may perform the conversion process of the coloring-material usage amount reduction process.

Next, a description is given of the relationship between the above process and the type of input image. The importance of visibility may vary depending on the objects constituting the image, such as characters, fill (filled-in area), lines, and photographs. As to the objects for which visibility is most important such as characters and lines, the target coloring-material usage amount can be set by using a coefficient "s" that is different from that used for the other objects. Another approach is to not perform the coloring-material usage amount reduction process for such objects.

When this other approach is implemented, the CMM conversion process is performed on objects such as characters and lines with the use of an LCT for a regular CMM conversion process, and the CMM conversion process is performed on other objects with the use of the above-described coloring-material usage amount reduction CMM conversion LUT. In the case where a coefficient "s", which is different from that used for the other objects, is used to set the target coloring-material usage amount for objects such as characters and lines, a coloring-material usage amount reduction CMM conversion LUT corresponding to each type of object is created, and the corresponding LUT is selected to perform the process.

Furthermore, there may be cases where the visibility and coloring material reduction are to be optimized in a more detailed manner. In this case, one approach is to use a different coefficient "s" for setting the target coloring-material usage amount for each of the objects such as characters, fill, lines, and photographs constituting the image. Another approach is to determine, for each type of object, different predetermined color data for applying the coloring-material usage amount reduction process.

The coloring-material usage amount reduction CMM conversion LUT may be called from a program as software parameters, or may be stored in a ROM or a RAM to be used in a hardware process. The coloring-material usage amount reduction CMM conversion LUT, or a program for executing a coloring-material usage amount reduction process with the use of the coloring-material usage amount reduction CMM conversion LUT, may be distributed by being saved in a data recording medium such as a CD or a DVD, or may be distributed via a network.

In the above description, the coloring-material usage amount reduction process is performed with the use of an LUT; however, the coloring-material usage amount reduction process may be performed by executing a computation process without using an LUT.

As described above, in an embodiment of the present invention, the coloring-material usage amount for monochrome printing (or the usage amount corresponding to the coloring material costs for monochrome printing) is used as a reference for determining the amount of coloring-material to be used for color printing. If the coloring-material usage amount for color printing is the same as that for monochrome printing, even when a monochrome printer is replaced with a color printer, the cost of consumables (coloring materials) that the user has to bear will not change.

In the case of monochrome printing, the necessary information for determining the image quality is expressed only by gradation properties. Therefore, by using the usage amount for monochrome printing as a reference to determine the reduced coloring-material usage amount for color printing, optimum gradation balance can be maintained for each hue. Thus, it is possible to form images having higher quality compared to images obtained by performing a simple thinning process and a uniform gradation decreasing process performed by executing a shift operation. Accordingly, the costs of coloring materials can be reduced while maintaining the image quality (balance of hues).

However, as described above, as to a color which requires a small coloring-material usage amount in monochrome printing such as a bright color (e.g., yellow), the visibility may decline as a result of reducing the coloring-material usage amount to that of monochrome printing. Thus, the coloring material is preferably reduced by a smaller amount for a color that is less visible compared to other colors, for the purpose of attaining visibility while reducing the coloring-material usage amounts to those for monochrome printing.

By reducing the coloring materials by different amounts for each type of element constituting an image, i.e., characters, lines, fill, photographs, etc., the minimum-required visibility can be achieved for each type of element constituting an image, while reducing coloring material costs by maximizing the reduction amount of the coloring material being used.

Next, a description is given of an application to a copier.

In copying operations (copying: scanning an original image and printing the image), the coloring-material usage amount reduction process can also be performed by matching the coloring-material usage amount in color copying with that of monochrome copying for each color. Accordingly, even when a monochrome copier is replaced with a color copier, the user can gain a high-quality color output environment without bearing increased costs. The procedures for creating a coloring-material usage amount reduction LUT used for copying operations (also referred to as a "coloring-material usage amount reduction copy mode CMM conversion LUT") are the same as those described above for the LUT for printing operations, except that "monochrome printing" is to be replaced with "monochrome copying", and "color printing" is to be replaced with "color copying". Therefore, the procedures are not further described.

In the case of a copier, the importance of visibility may vary according to the objects constituting the scanned image, such as characters, fill, lines, and photographs. When the copier is capable of distinguishing the objects constituting the scanned image, different processes may be performed for different objects. For example, as to the objects for which visibility is most important such as characters and lines, the user may select whether to use a coefficient "s" that is different from that used for the other objects, or to not perform the coloring-material usage amount reduction process. When the coloring-material usage amount reduction process is not performed on characters and lines, a CMM conversion LUT of a regular mode (mode in which coloring-material usage amount reduction process is not performed) is used for characters and lines, and a coloring-material usage amount reduction copy mode CMM conversion LUT is used for other objects. Furthermore, when different coefficients "s" are used for character objects/line objects and objects other than character objects/line objects, a coloring-material usage amount reduction copy mode CMM conversion LUT may be created for each object type, and the LUTs thus created may be used for the respective object types.

When there are copy modes such as a "black character priority copy mode" for highlighting black characters, a "character priority copy mode" for highlighting characters, and a "photograph priority copy mode" for prioritizing gradation properties, a target coloring-material usage amount may be defined for each of these copy modes.

In the black character priority copy mode, target coloring-material usage amounts are defined for increasing the amount of coloring material used for expressing black characters and decreasing the amount of coloring material used for expressing other colors. Furthermore, a coloring-material usage amount reduction copy mode CMM conversion LUT is created for converting the image data into data for achieving the target coloring-material usage amounts. Accordingly, the overall coloring-material usage amount for black and colors other than black can be reduced.

In the character priority copy mode, the target coloring-material usage amounts are defined for increasing the coloring-material usage amount used for expressing characters of colors selected by the user, and decreasing the coloring-material usage amounts used for expressing other colors. Furthermore, a coloring-material usage amount reduction copy mode CMM conversion LUT is created for converting the image data into data for achieving the target coloring-material usage amounts. Accordingly, the total coloring-material usage amount including that of the selected color and colors other than the selected color can be reduced.

In the photograph priority copy mode, the target coloring-material usage amounts are defined for increasing/decreasing the coloring-material usage amounts of the respective colors, so that the gradation is smoothly expressed. Furthermore, a coloring-material usage amount reduction copy mode CMM conversion LUT is created for converting the image data into data for achieving the target coloring-material usage amounts. Accordingly, the overall coloring-material usage amount can be reduced while preventing the appearance of the image from degrading by adjusting the gradation properties such that the brightness property becomes near linear, prioritizing the visual balance of the colors in the entire image, and setting limits to the coloring-material usage amounts.

Then, the coloring-material usage amount reduction copy mode CMM conversion LUT corresponding to the specified copy mode is selected, and a coloring-material usage amount reduction process is performed. Accordingly, the coloring-material usage amount can be reduced by an optimum amount according to the copy mode while preventing the image quality from degrading.

Next, a description is given of an application to a process performed on image data output by an image forming apparatus capable of performing double-sided printing (double-sided recording). When there are modes for performing double-sided recording and single-sided recording, if the same amount of ink as that used for single-sided recording is jetted for double-sided recording, wrinkles may be formed in the sheet. Therefore, different total regulation values are set for single-sided recording and double-sided recording. Thus, there will be a difference in the colors (darkness) of an image formed by double-sided recording and an image formed by single-sided recording, even if the same data is used.

Accordingly, by setting different target coloring-material usage amounts of the coloring-material usage amount reduction process for double-sided recording and single-sided recording, the same colors (darkness) can be achieved for the same data in single-sided recording and double-sided recording.

As described above, in the coloring-material usage amount reduction process, the coloring-material usage amount for monochrome printing is used as a reference. In the single-sided recording mode, the target coloring-material usage amount is defined based on the coloring material amount used in monochrome printing. However, in the double-sided recording mode, the "coloring material amount with which double-sided recording can be performed without the need of drying time" or the "coloring material amount with which strike-through can be prevented" is defined as the target coloring-material usage amount.

The "coloring material amount with which double-sided recording can be performed without the need of drying time" means that with this coloring material amount, the ink will not smear on a sheet when the sheet is reversed, even if there is no drying time. Specifically, in double-sided recording, when there is too much coloring material on the sheet when the sheet is reversed, the coloring material will adhere to the sheet-reversing mechanism unless the coloring material dries completely, and the ink will smear on the sheet. Thus, by setting an upper limit in the coloring-material usage amount such that double-sided recording can be performed without the need of drying time, degradation of the image can be prevented when double-sided recording is performed.

The "coloring material amount with which strike-through can be prevented" means that with this coloring material amount, the image quality is prevented from degrading as a result of an image on a first side being visible through a second side or an image on a second side being visible through a first side. That is, when there is too much coloring material when performing double-sided recording, the image quality may degrade as a result of an image on a first side being visible through a second side or an image on a second side being visible through a first side. By setting an upper limit in the coloring-material usage amount such that strike-through can be prevented, the image is prevented from being degraded when double-sided recording is performed.

Figure 8:
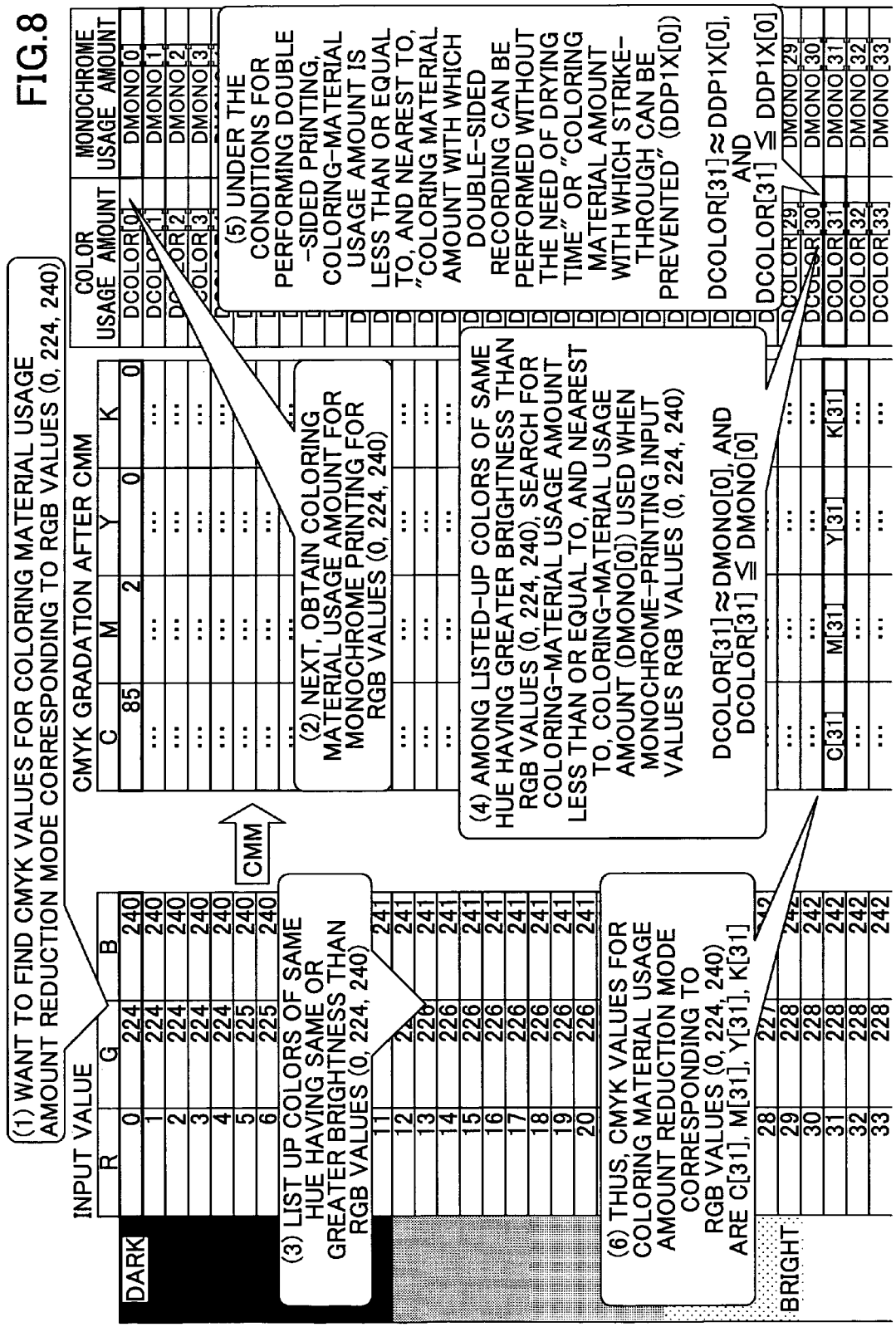
FIG. 8 illustrates a procedure of creating an LUT used in a CMM conversion process including a coloring material usage amount reduction process performed by a fifth example of an image processing apparatus according to an embodiment of the present invention.

Next, a description is given, with reference to FIG. 8, of the procedure of creating the coloring-material usage amount reduction LUT used by the CMM conversion processing unit 2B for performing the process of converting data such that the coloring-material usage amount is reduced in accordance with the double-sided recording operation. First, as described with reference to FIG. 3, the coloring-material usage amount is obtained (DMONO[0] in the example shown in FIG. 8) for a case of monochrome-printing (monochrome conversion) predetermined input values (RGB values: input image data of R=0, G=224, B=240 in the example shown in FIG. 8) (procedures (1) and (2) in FIG. 8).

Next, colors of the same hue having the same or greater brightness than the input values (R=0, G=224, B=240) are listed up (procedure (3) in FIG. 8). In this procedure, the colors of the hue are listed up based on the CMM conversion LUT used in a regular mode (mode in which the coloring-material usage amount is not reduced).

Next, the coloring-material usage amounts of the listed-up colors of the same hue having the same or greater brightness than the input values, are listed up (usage amounts for color printing: DCOLOR[*]). The CMM conversion processing unit 2B searches for the coloring-material usage amount that is less than or equal to, and nearest to, the coloring-material usage amount (DMONO[0]) used when monochrome-printing the input values (procedure (4) in FIG. 8). That is, the CMM conversion processing unit 2B searches for a conversion condition by which the coloring-material usage amount becomes less than or equal to a monochrome conversion coloring material amount of the input values (DMONO[0] in the example shown in FIG. 8) (in FIG. 8, DCOLOR[31] corresponds to the coloring-material usage amount for color printing that satisfies this condition).

In this example, under the conditions for performing double-sided printing, the coloring-material usage amount is to be less than or equal to, and nearest to, the "coloring material amount with which double-sided recording can be performed without the need of drying time" or the "coloring material amount with which strike-through can be prevented" (DDP1X[0]) (in FIG. 8, DCOLOR[31] corresponds to the coloring-material usage amount for color printing that satisfies the conditions with which double-sided printing can be performed) (procedure (5) in FIG. 8).

Then, the search-found conversion conditions (C[31], M[31], Y[31], and K[31] in the example shown in FIG. 8) are used as the color conversion values in the coloring-material usage amount reduction mode under the conditions for performing double-sided printing (procedure (6) in FIG. 8).

By obtaining such a condition for each input value, a coloring-material usage amount reduction CMM conversion LUT used under the conditions for performing double-sided printing, can be created.

Next, a description is given of total amount regulation.

First, under the recording conditions where importance is placed on visibility, and double-sided recording and single-sided recording operations are mixed, the upper limit of the coloring-material usage amount per unit area (total amount regulation value) is lowered (reduced) compared to the case of a "regular recording mode" (mode in which the coloring-material usage amount is not reduced). Thus, the image data can be converted into data that satisfies printing conditions where double-sided recording can be performed without the need of drying time and strike-through can be prevented.

Furthermore, when the recording condition is set only for the purpose of the coloring-material reduction process, the upper limit of the coloring-material usage amount per unit area is even further reduced, so that the amount becomes the same as that for monochrome-printing.

Figure 9:
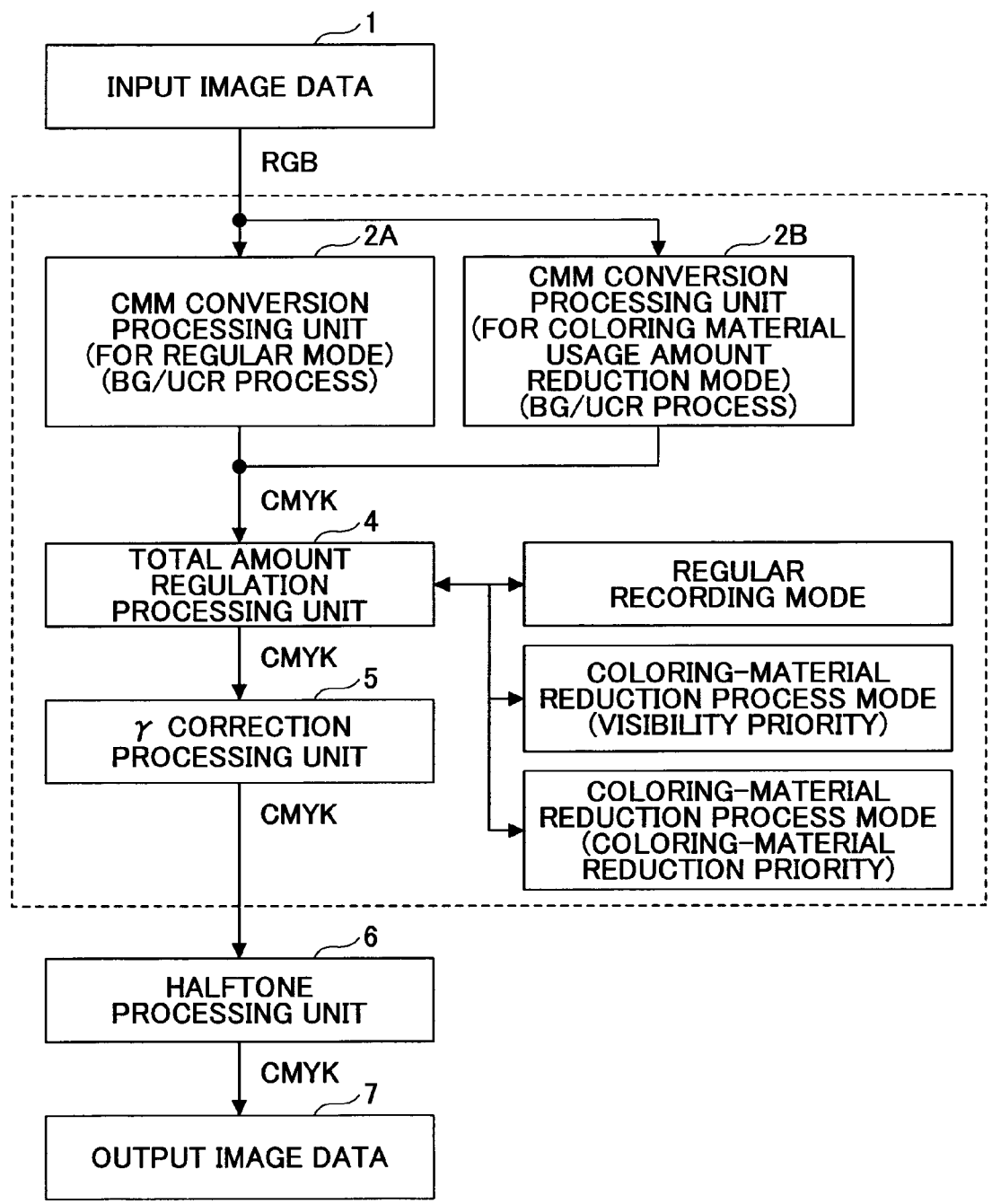
FIG. 9 is a functional block diagram of a sixth example of an image processing apparatus according to an embodiment of the present invention.

As shown in FIG. 9, the upper limit of the coloring-material usage amount per unit area can be switched by selecting a total amount regulation value used by the total amount regulation processing unit 4. Specifically, the total amount regulation value is selected from among that of a regular recording mode, a coloring-material reduction process mode (visibility priority), and another coloring-material reduction process mode (coloring-material reduction priority). The coloring-material reduction process means a "mode for performing a coloring-material reduction process".

Figure 10:
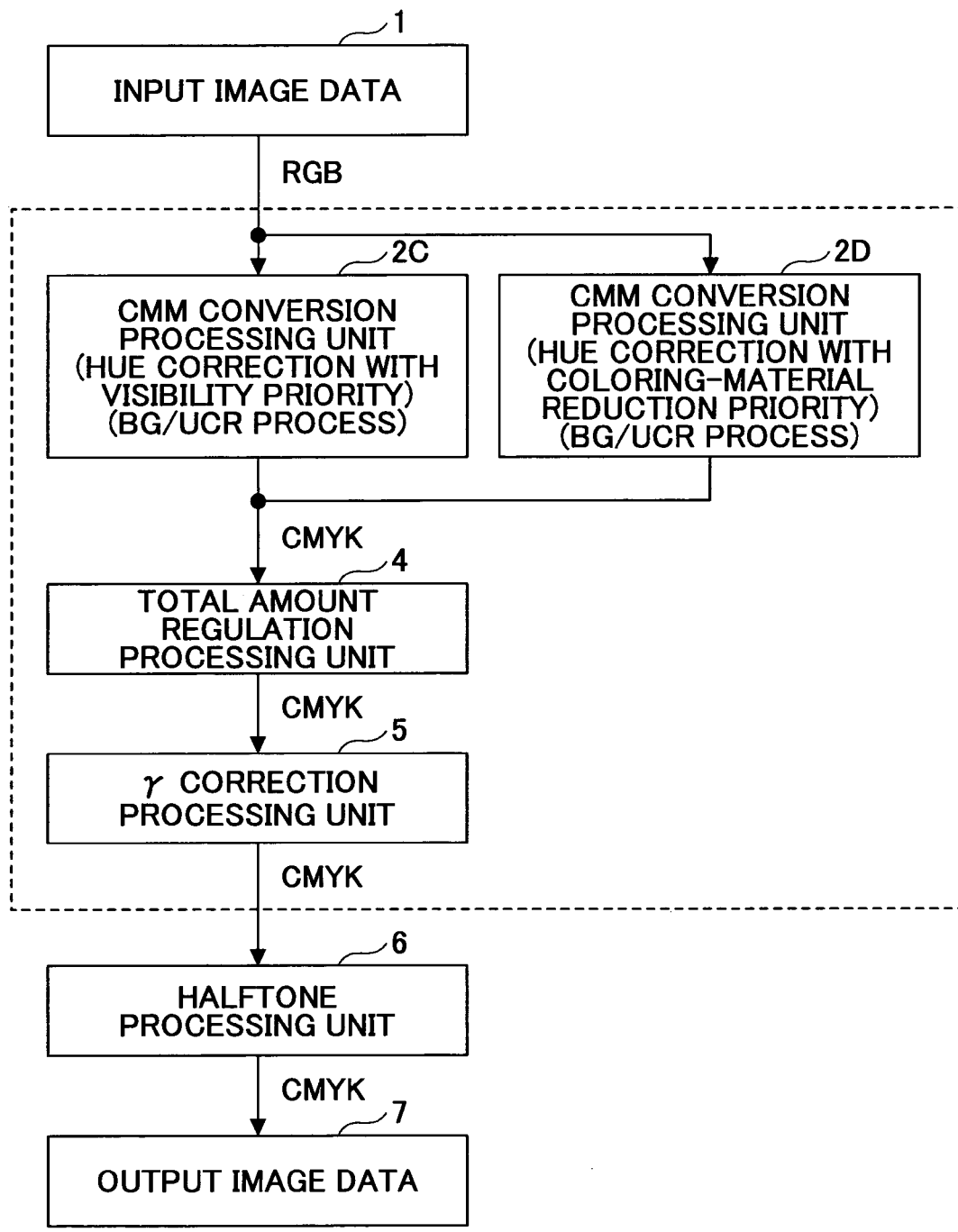
FIG. 10 is a functional block diagram of a seventh example of an image processing apparatus according to an embodiment of the present invention.

Furthermore, as shown in FIG. 10, a CMM conversion processing unit 2C and a CMM conversion processing unit 2D may be provided. Specifically, the CMM conversion processing unit 2C is integrated with a BG/UCR processing unit, and is also integrated with a unit for performing hue correction such that visibility is prioritized. The CMM conversion processing unit 2D is integrated with a BG/UCR processing unit, and is also integrated with a unit for performing hue correction such that coloring material reduction is prioritized. By switching between the CMM conversion processing unit 2C and the CMM conversion processing unit 2D according to recording conditions, the upper limit of the coloring-material usage amount per unit area can be switched.

Figure 11:
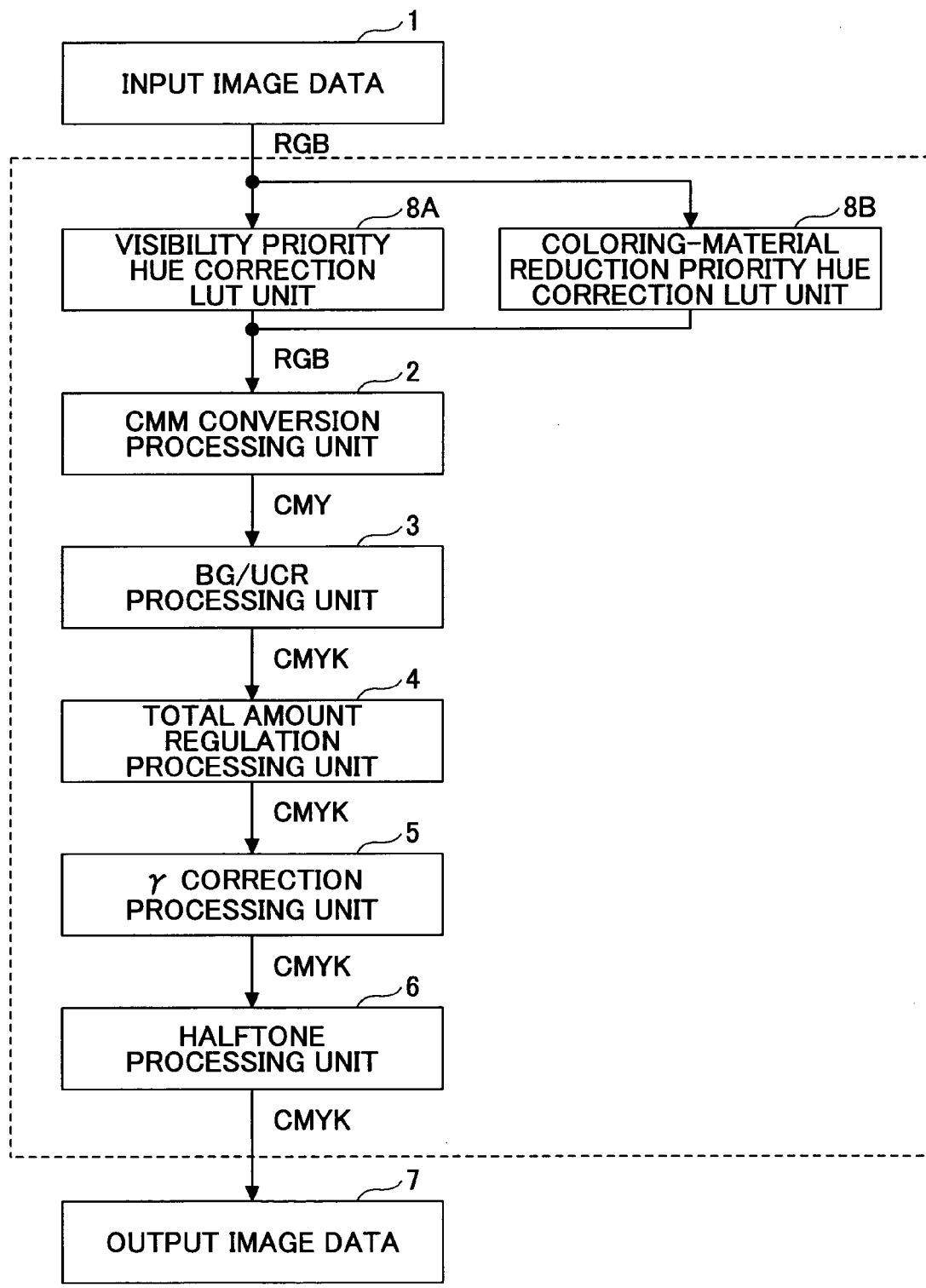
FIG. 11 is a functional block diagram of an eighth example of an image processing apparatus according to an embodiment of the present invention.
Figure 12:
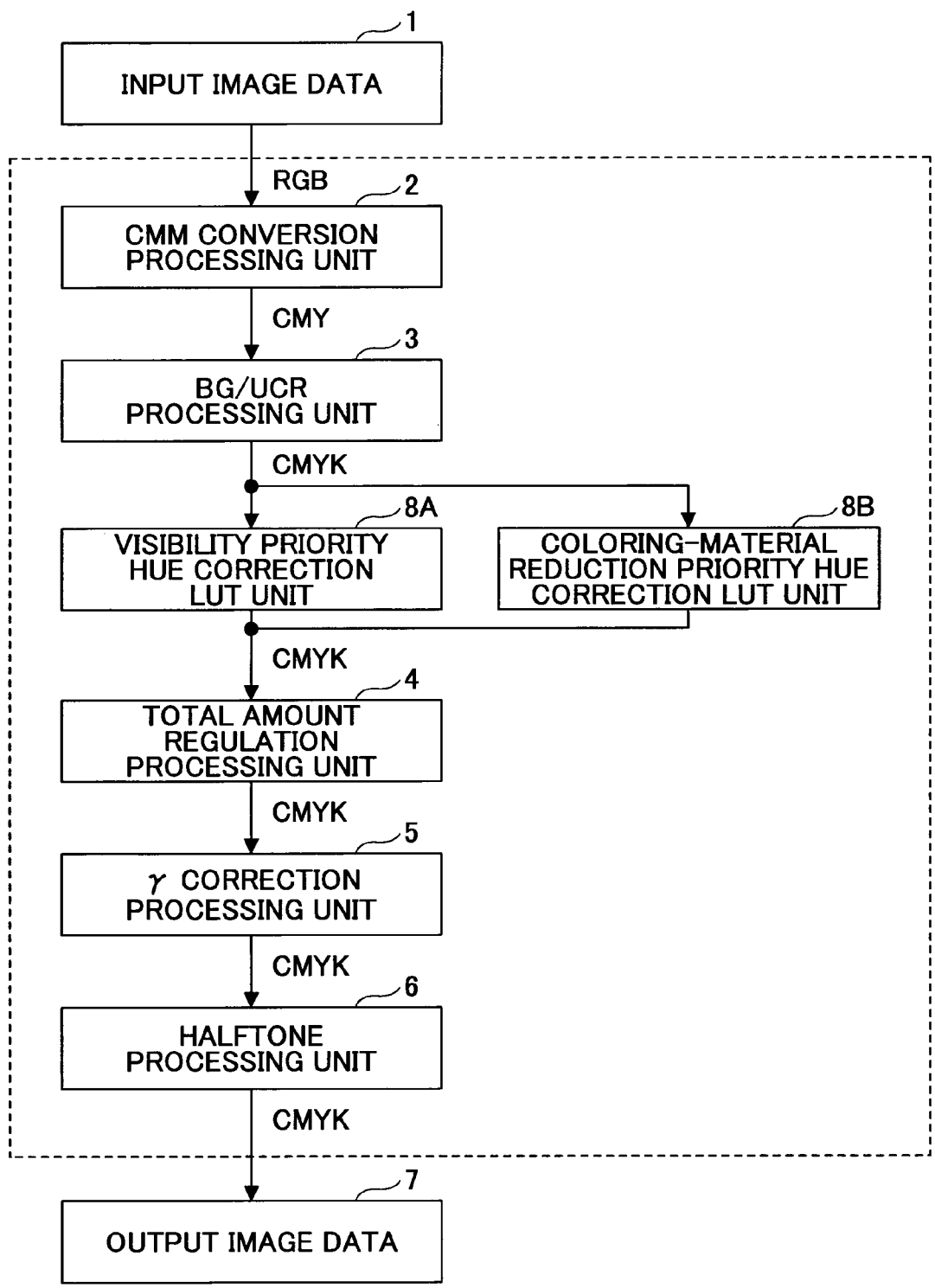
FIG. 12 is a functional block diagram of a ninth example of an image processing apparatus according to an embodiment of the present invention.

Furthermore, as shown in FIGS. 11 and 12, a visibility priority hue correction LUT unit 8A and a coloring-material reduction priority hue correction LUT unit 8B may be provided for a pre-process of the CMM conversion processing unit 2 or a post-process of the BG/UCR processing unit 3. By switching between the visibility priority hue correction LUT unit 8A and the coloring-material reduction priority hue correction LUT unit 8B according to recording conditions, the upper limit of the coloring-material usage amount per unit area can be switched.

As described above, the total amount regulation value per unit area is reduced according to recording conditions, by reducing the total amount regulation value (upper limit) for the mode for performing the coloring-material usage amount reduction process compared to that for the regular recording mode. Accordingly, even if the copier is not capable of distinguishing objects, as for black characters or black lines for which visibility is most important, the image quality can be prevented from degrading as a result of coloring material reduction, in both single-sided recording and double-sided recording. Furthermore, when the recording condition only includes single-sided recording, the target coloring-material usage amount is defined in consideration of only the coloring material amount for monochrome printing. When the recording condition also includes double-sided recording, the coloring-material usage amount is reduced such that double-sided recording can be performed without requiring drying time and without causing strike-through. Accordingly, an image produced by single-sided recording and an image produced by double-sided recording can be prevented from having different image qualities.

In this case, by switching the upper limit (total amount regulation value) of the coloring-material usage amount per unit area according to the copy mode, an optimum image can be formed in accordance with the copy mode of single-sided recording or double-sided recording.

Figure 13:
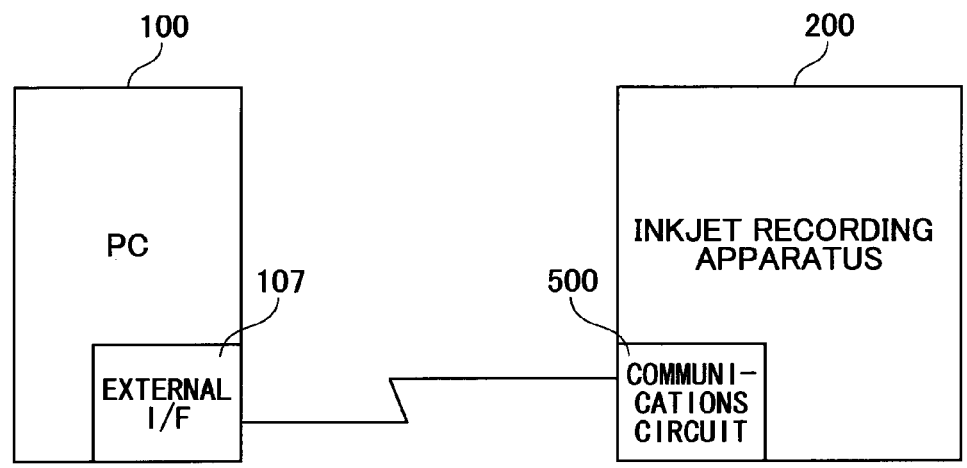
FIG. 13 is a block diagram of an example of a printing system according to an embodiment of the present invention.

Next, with reference to FIG. 13, a description is given of an example of a printing system according to an embodiment of the present invention, which is constituted by an image processing apparatus according to an embodiment of the present invention and an inkjet printer (inkjet recording apparatus) corresponding to an image forming apparatus.

The printing system (image forming system) includes at least one image processing apparatus 100 constituted by a personal computer (PC) or the like, and an inkjet printer (inkjet recording apparatus) 200, which are connected by a predetermined interface or a network.

Figure 14:
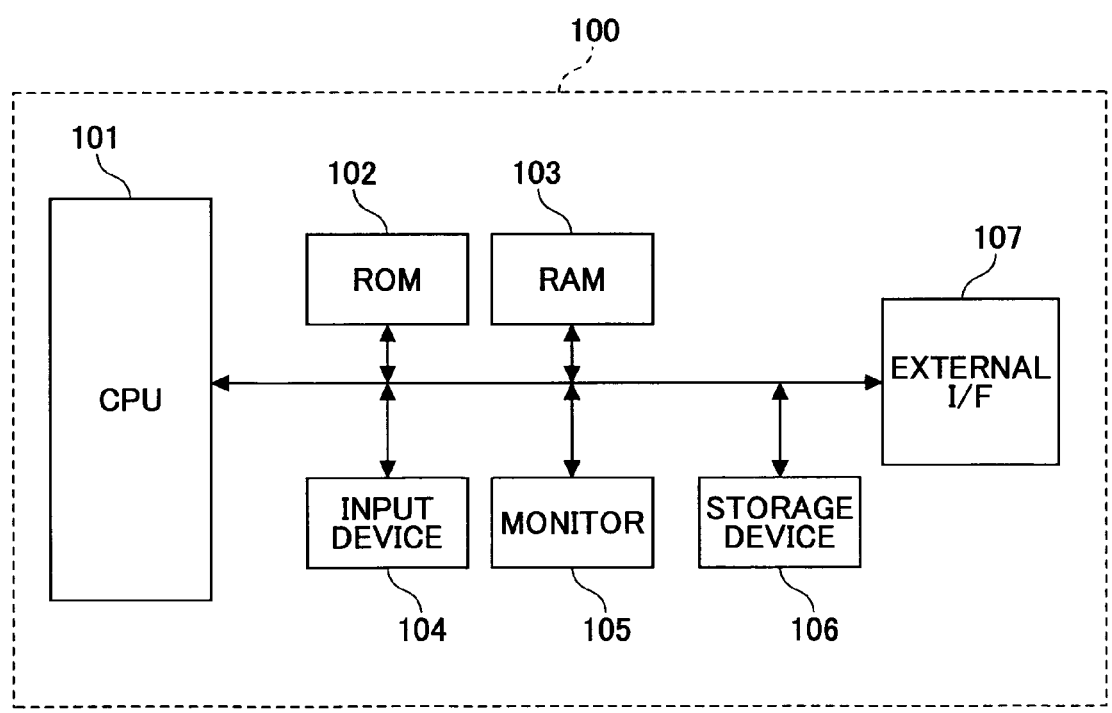
FIG. 14 is a block diagram of an image processing apparatus (information processing apparatus) in the printing system.

As shown in FIG. 14, the image processing apparatus 100 includes a CPU 101 and a ROM 102 and RAM 103 that are memory means, which are connected by a bus line. The following elements are also connected to the bus line via predetermined interfaces: a storage device 106 constituted by a magnetic storage such as a hard disk; an input device 104 such as a mouse and a keyboard; a monitor 105 such as a liquid crystal display (LCD) or a cathode-ray tube (CRT); a recording medium reading device (not shown) for reading a recording medium such as an optical disk; and a predetermined interface (external I/F) 107 for communicating with an external device, such as a network (e.g., the Internet) and a Universal Serial Bus (USB).

The storage device 106 of the image processing apparatus 100 stores image processing programs such as a program according to an embodiment of the present invention for executing the CMM conversion process using the coloring-material usage amount reduction process LUT. The image processing program is installed in the storage device 106 by being read out from a recording medium by the recording medium reading device or by being downloaded via a network such as the Internet. By having the image processing program installed, the image processing apparatus 100 becomes capable of executing the same imaging process as that of the above-described image processing apparatus. The image processing program may operate on a predetermined OS. The image processing program may constitute part of certain application software.

In the image processing apparatus 100, a print command from application software is subjected to image processing at a printer driver incorporated as software. Thus, multi-value dot pattern data (output image data) that can be output by the inkjet recording apparatus 200 is generated. This data is rasterized, transferred to the inkjet recording apparatus 200, and printed out by the inkjet recording apparatus 200.

Figure 15:
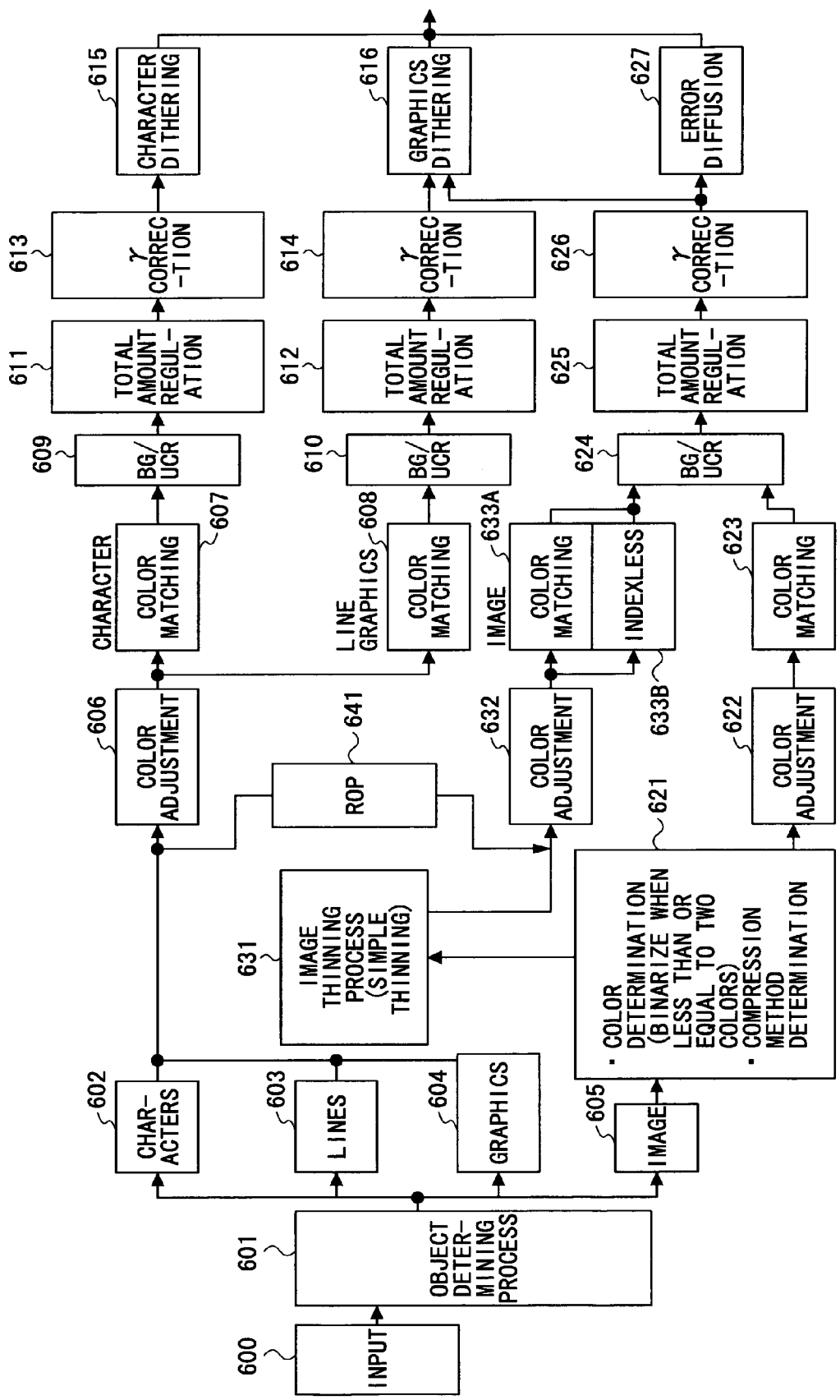
FIG. 15 is a block diagram illustrating the data flow in the image processing apparatus.

The flow of an imaging process executed by the printer driver serving as a program according to an embodiment of the present invention in the image processing apparatus 100 is described with reference to a block diagram shown in FIG. 15.

When a "print" instruction is given by application software operating in a data processing apparatus such as a personal computer, the printer driver performs an object determining process 601 on the input 600 to determine the types of objects. Data is passed on as each type of object, i.e., character data 602, line data 603, graphic data 604, and image data 605. The process is performed as the data passes through the respective routes.

Specifically, a color adjustment process 606 is performed on the characters 602, the lines 603, and the graphics 604. Furthermore, the characters 602 are subjected to a color matching process (CMM conversion process) 607, a BG/UCR process 609, a total amount regulation process 611, a γ correction process 613, and a character dithering process (halftone process) 615. The lines 603 and graphics 604 are subjected to a color matching process 608, a BG/UCR process 610, a total amount regulation process 612, a γ correction process 614, and a graphics dithering process (halftone process) 616.

Meanwhile, the image 605 is subjected to a color determination and compression method determination process 621. Then, in regular cases, the image 605 is subjected to a color adjustment process 622, a color matching process 623, a BG/UCR process 624, a total amount regulation process 625, a γ correction process 626, and an error diffusion process (halftone process) 627. When there are less than or equal to two colors, the image 605 is subjected to an image thinning process 631, a color adjustment process 632, and a color matching process 633A or an indexless process (process in which color matching is not performed) 633B, and then to the BG/UCR process 624, the total amount regulation process 625, the γ correction process 626, and the error diffusion process (halftone process) 627.

As to the lines and graphics, the process may branch before reaching the color adjustment process 606, to be subjected to a ROP process 641, and then to the color adjustment process 632 that is performed for the image.

The processed image data of each of the object types is then combined into the same original image data. The combined data is subjected to a rasterizing process (not shown), and passed to the inkjet recording apparatus 200.

In the color matching process 623 performed on the image, a CMM conversion process is performed with the use of the above-described coloring-material usage amount reduction LUT. Thus, when color-printing the image, the coloring-material usage amount is reduced to be the same as that for monochrome printing.

Figure 16:
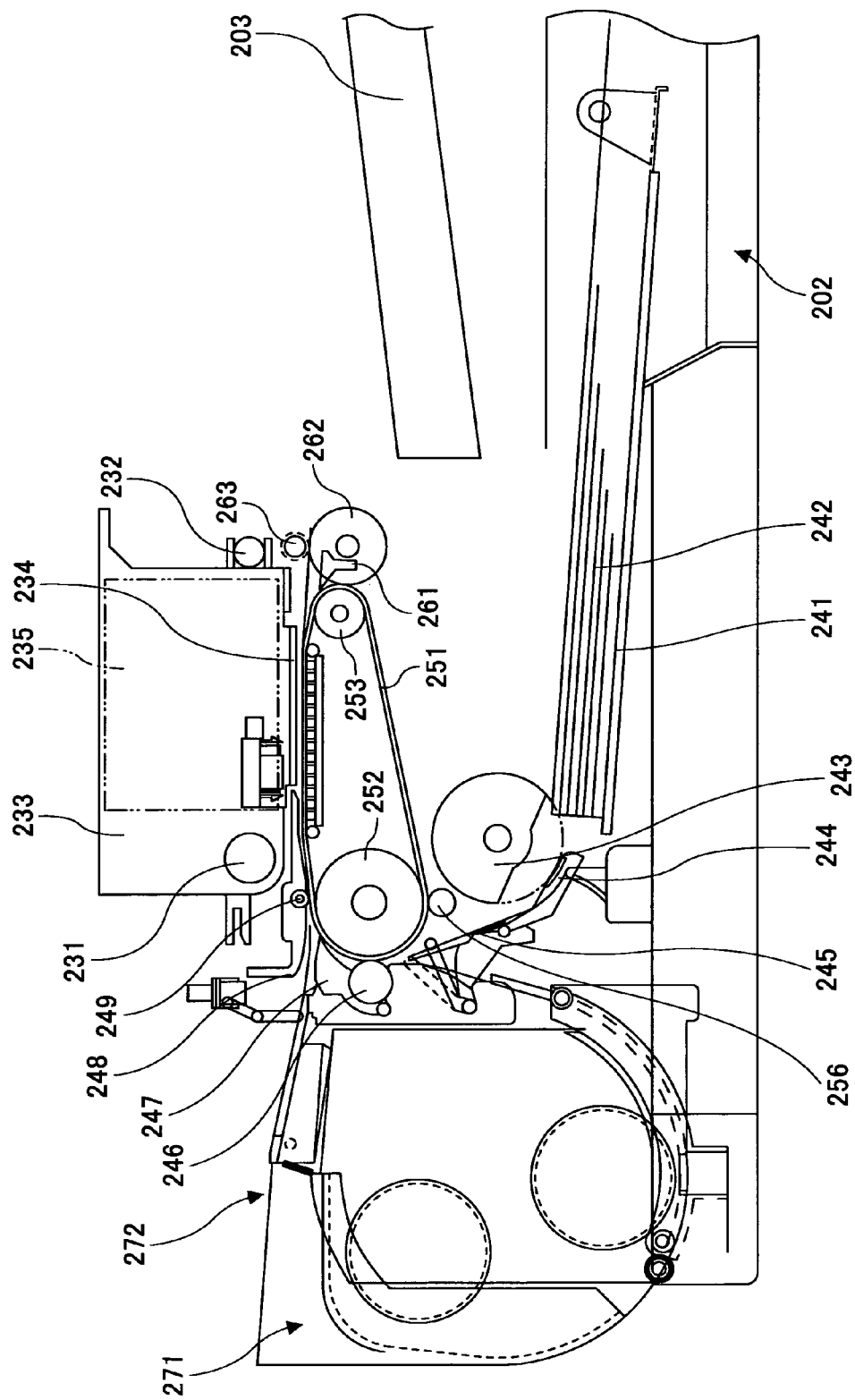
FIG. 16 is a side view of a mechanism part of an inkjet recording apparatus in the printing system.
Figure 17:
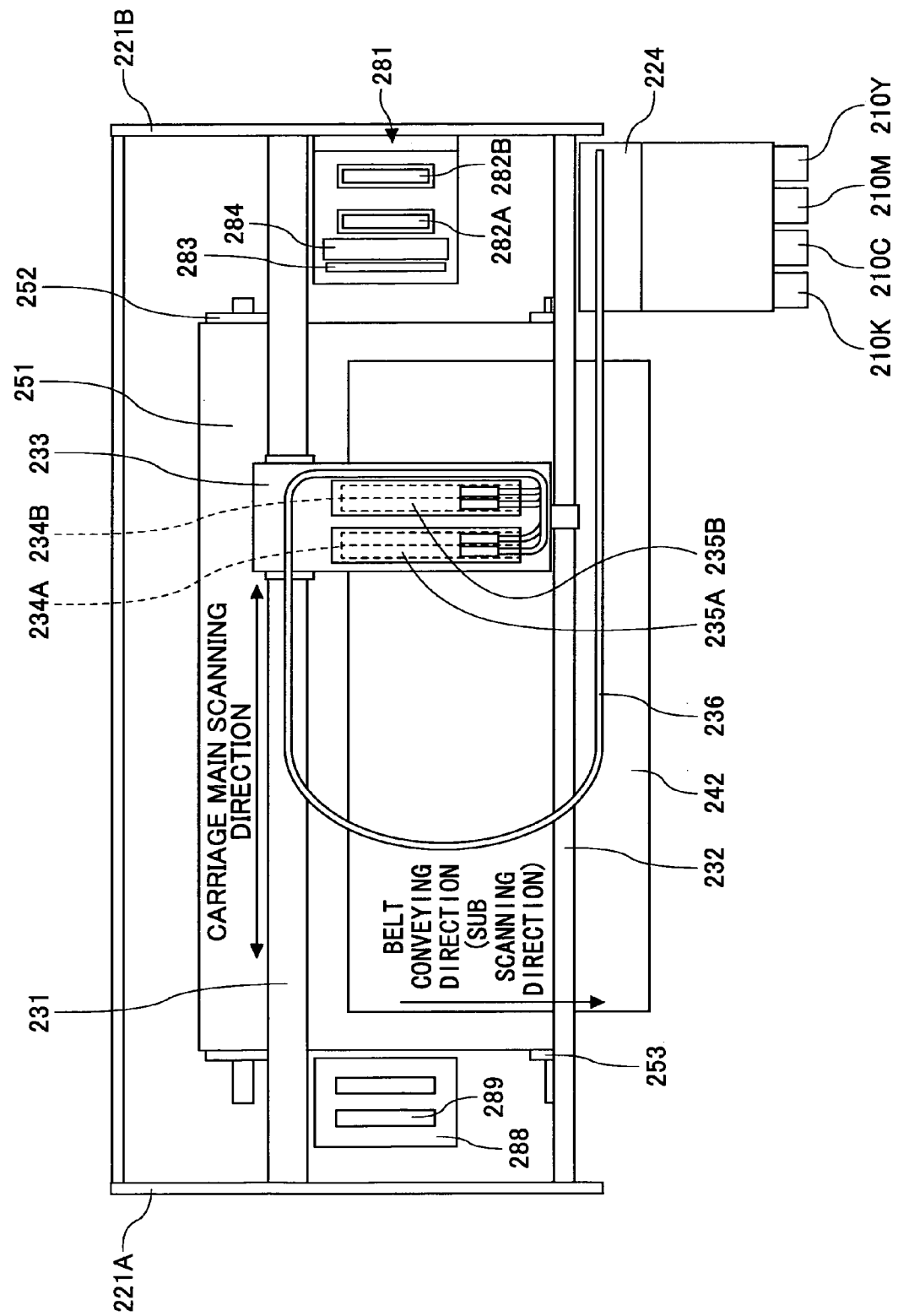
FIG. 17 is a top view of relevant parts of the mechanism part of the inkjet recording apparatus.
Figure 18:
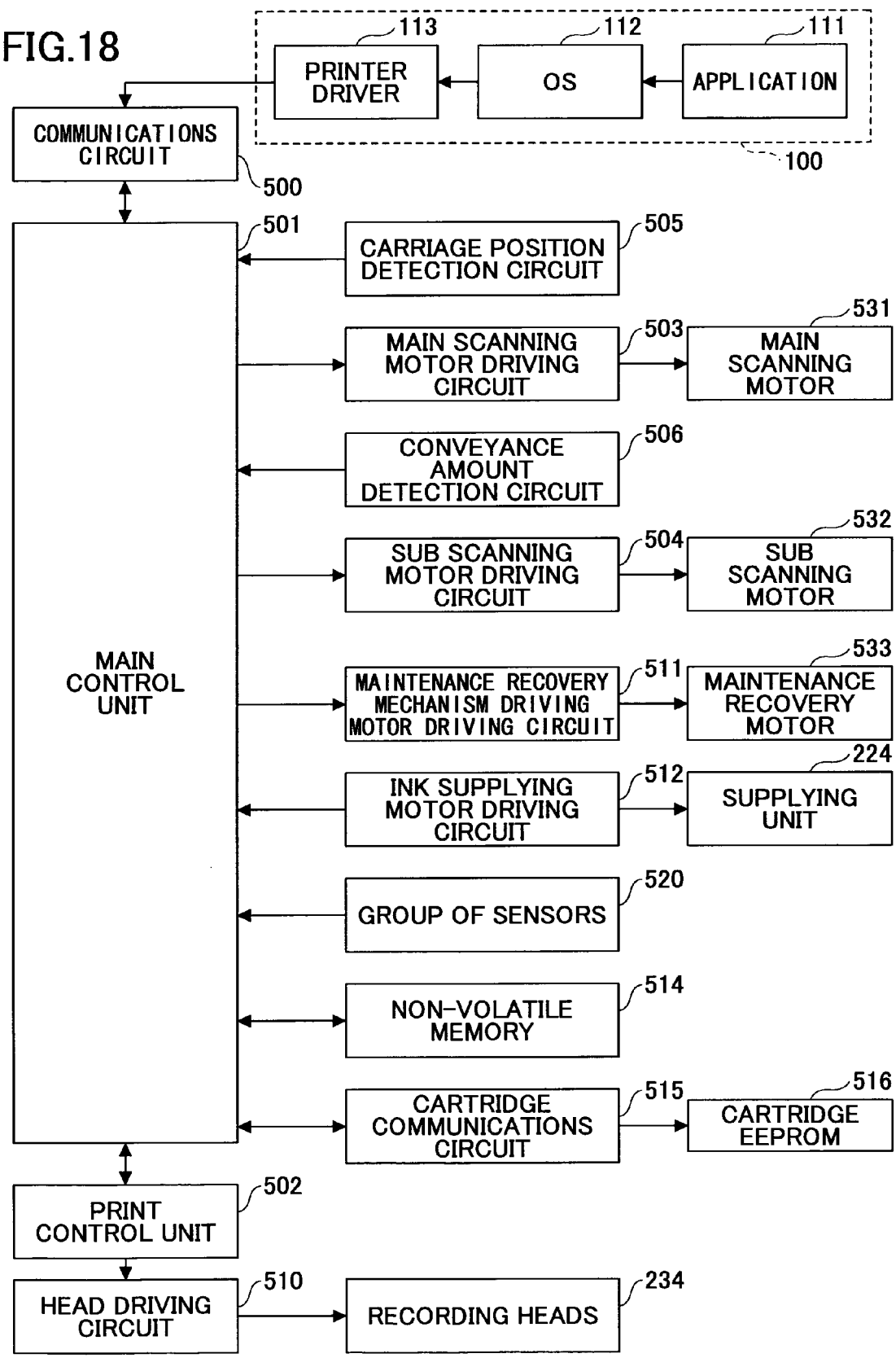
FIG. 18 is a block diagram of a control unit of the inkjet recording apparatus.

Next, the inkjet recording apparatus 200 is described with reference to FIGS. 16 through 18. FIG. 16 schematically illustrates the overall structural configuration of the inkjet recording apparatus 200, FIG. 17 is a top view of relevant parts of the structural configuration, and FIG. 18 is a block diagram of a control unit of the inkjet recording apparatus 200.

The inkjet recording apparatus 200 is a serial type image forming apparatus. Guide rods 231 and 232 (in a master-subordinate relationship) are laid across laterally between left and right side plates 221A and 221B. A carriage 233 is slidably held in the main scanning direction by the guide rods 231 and 232, and is moved/scanned in a direction (carriage main scanning direction) indicated by an arrow by a timing belt driven by a main scanning motor (not shown).

The carriage 233 has recording heads 234A and 234B (may collectively be referred to as recording heads 234) constituted by liquid jetting heads according to an embodiment of the present invention for jetting ink droplets of the respective colors of yellow (Y), cyan (C), magenta (M), and black (K). The recording heads 234A and 234B have nozzle rows each including plural nozzles, which are arranged in a sub scanning direction that is orthogonal to the main scanning direction. The recording heads 234A and 234B are provided such that the ink droplets are jetted in a downward direction.

The recording heads 234 each have two nozzle rows. In the recording head 234A, one of the nozzle rows jets liquid droplets of black (K), and the other nozzle row jets liquid droplets of cyan (C). In the recording head 234B, one of the nozzle rows jets liquid droplets of magenta (M), and the other nozzle row jets liquid droplets of yellow (Y). In this example, two recording heads are used for jetting liquid droplets of four colors. However, in another example, one recording head may be provided for each of the colors. In yet another example, a single recording head may be provided for four colors, i.e., the recording head may have plural nozzle rows for jetting liquid droplets of four colors.

The carriage 233 has sub tanks 235A and 235B (may collectively be referred to as sub tanks 235) corresponding to the nozzle rows of the recording heads 234, for supplying ink of respective colors. A supplying unit 224 supplies ink of respective colors from ink cartridges 210 of respective colors to the sub tanks 235 through supplying tubes 236.

Meanwhile, a sheet feeding unit is for feeding sheets 242 stacked on a sheet stacking part (pressure plate) 241 in a sheet feeding tray 202. The sheet feeding unit includes a semilunar roller (sheet feeding roller) 243 for separating each sheet from the sheets 242 in the sheet stacking part 241 and feeding the separated sheet one by one, and a separation pad 244 made of a material having a high friction coefficient that is provided opposite to the sheet feeding roller 243. The separation pad 244 is urged toward the sheet feeding roller 243.

In order to send the sheet 242 fed out from the sheet feeding unit to a position under the recording heads 234, the following elements are provided: a guide member 245 for guiding the sheet 242; a counter roller 246; a conveyance guide member 247; a holding member 248 having a leading-edge pressurizing roller 249; and a conveying belt 251 which is a conveying unit for electrostatically attracting the fed-out sheet 242 and conveying the sheet 242 to a position facing the recording heads 234.

The conveying belt 251 is an endless belt, which is wound around a conveying roller 252 and a tension roller 253, and rotates in a belt conveying direction (sub scanning direction). Furthermore, a charging roller 256 is a charging unit provided for charging the surface of the conveying belt 251. The charging roller 256 contacts the surface of the conveying belt 251 and is rotated by the conveying belt 251. The conveying belt 251 is caused to rotate in the belt conveying direction as the conveying roller 252 is rotated by a sub scanning motor (not shown) at a predetermined timing.

A sheet eject unit for ejecting the sheet 242 on which an image has been recorded by the recording heads 234, includes a separation claw 261 for separating the sheet 242 from the conveying belt 251, sheet eject rollers 262 and 263, and a sheet eject tray 203 provided beneath the sheet eject roller 262.

A double-sided unit 271 is removably attached to the back side of the apparatus. The double-sided unit 271 receives the sheet 242 that is returned as the conveying belt 251 rotates in an opposite direction, reverses the sheet 242, and feeds back the reversed sheet 242 between the counter roller 246 and the conveying belt 251. The top surface of the double-sided unit 271 serves as a manual feed tray 272.

In a non-printing region on one side of the scanning direction of the carriage 233, a maintenance recovery mechanism 281 is provided for maintaining and recovering the conditions of the nozzles of the recording heads 234. The maintenance recovery mechanism 281 includes cap members (hereinafter, "caps") 282A and 282B (may collectively be referred to as caps 282) for capping the nozzle surfaces of the recording heads 234, a wiper blade 283 that is a blade member for wiping the nozzle surfaces, and an idle jetting receiver 284 for receiving liquid droplets when the recording heads 234 perform idle jetting for jetting liquid droplets, which are not used for the actual recording but are jetted for the purpose of ejecting recording liquid having increased viscosity.

In the non-printing region on the other side of the scanning direction of the carriage 233, another idle jetting receiver 288 is provided for receiving liquid droplets when the recording heads 234 perform idle jetting for jetting liquid droplets, which are not used for the actual recording but are jetted for the purpose of ejecting recording liquid having increased viscosity during a printing operation. The idle jetting receiver 288 has opening parts 289 extending along a nozzle row direction of the recording heads 234.

As shown in FIG. 18, a control unit of the inkjet recording apparatus 200 includes a main control unit 501 constituted by a microcomputer for controlling the entire apparatus and a print control unit 502 constituted by a microcomputer for controlling printing operations. The control unit receives image data from the image processing apparatus (information processing apparatus) 100 via a communications circuit 500. In the image processing apparatus 100, when a printing command is received from a user via an application 111, an OS (for example, GDI:Graphic Device Interface) 112 outputs, to a printer driver 113, image data that is to be output with the inkjet recording apparatus 200. The printer driver 113 converts the image data transferred from the application 111 into printing image data in a format that can be processed by the inkjet recording apparatus 200, and inputs the printing image data to the inkjet recording apparatus 200 via the external I/F 107 and the communications circuit 500.

To form an image on the sheet 242 based on image data input from the communications circuit 500, the main control unit 501 drives/controls a main scanning motor 531 for moving/scanning the carriage 233 and a sub scanning motor 532 for rotating/driving the conveying roller 252 via a main scanning motor driving circuit 503 and a sub scanning motor driving circuit 504, respectively, and sends printing data to the print control unit 502.

The main control unit 501 receives detection signals from a carriage position detection circuit 505 for detecting the position of the carriage 233. The main control unit 501 controls the position and movement speed of the carriage 233 based on the detection signals. The carriage position detection circuit 505 detects the position of the carriage 233 by reading and calculating the number of slits in an encoder sheet placed in the scanning direction of the carriage 233, with the use of a photosensor installed in the carriage 233. The main scanning motor driving circuit 503 rotates/drives the main scanning motor 531 in accordance with the carriage movement amount input from the main control unit 501, to move the carriage 233 to a predetermined position at a predetermined speed.

The main control unit 501 receives detection signals from a conveyance amount detection circuit 506 for detecting the movement amount of the conveying belt 251. The main control unit 501 controls the movement amount and the movement speed of the conveying belt 251 based on the detection signals. The conveyance amount detection circuit 506 detects, with the use of a photosensor, the conveyance amount by reading and calculating the number of slits in a rotational encoder sheet attached around a rotational shaft of the conveying roller 252. The sub scanning motor driving circuit 504 rotates/drives the sub scanning motor 532 in accordance with the conveyance amount input from the main control unit 501, to rotate/drive the conveying roller 252 so that the conveying belt 251 is moved to a predetermined position at a predetermined speed.

The main control unit 501 rotates the sheet feeding roller 243 once by providing a sheet feeding roller driving command to a sheet feeding roller driving circuit (not shown). The main control unit 501 rotates/drives a motor 533 via a maintenance recovery mechanism driving motor driving circuit 511, to move up and down the caps 282 and the wiper blade 283.

The main control unit 501 drives a supplying pump of the supplying unit 224 via an ink supplying motor driving circuit 512 to control the operation of supplying ink from the ink cartridges 210 to the sub tanks 235.

The main control unit 501 receives various detection signals from a group of sensors 520. The main control unit 501 uses a cartridge communications circuit 515 to acquire information stored in non-volatile memories 516 that are storage units provided in each of the ink cartridges 210, perform a predetermined process on the information, and store the information in a non-volatile memory (EEPROM) 514 that is a storage unit provided in the main unit of the inkjet recording apparatus 200.

Information indicating the coloring material cost per unit amount of ink (coloring material) or information indicating the type of the coloring material may be stored in the non-volatile memories 516 (information storing units) of the ink cartridges 210. The coloring material cost information and the coloring material type information may be acquired by the main control unit 501 and transferred to the image processing apparatus 100.

The print control unit 502 generates data for driving a pressure generating unit for jetting liquid droplets from the recording heads 234 based on signals from the main control unit 501 and the carriage position and conveyance amount received from the carriage position detection circuit 505 and the conveyance amount detection circuit 506, and provides the generated data to a head driving circuit 510.

The head driving circuit 510 drives the pressure generating units (piezo-electric elements in the case of piezo type heads) of the recording heads 234 based on printing data from the print control unit 502 to jet liquid droplets from particular nozzles.

In the inkjet recording apparatus 200 having such a configuration, each sheet is separated from the sheets 242 in the sheet feeding tray 202. The sheet 242 that is fed out in a substantially vertical upward direction is guided by the guide member 245, and conveyed by being sandwiched by the conveying belt 251 and the counter roller 246. Then, the leading edge of the sheet 242 is guided by the conveyance guide member 247 and pressed against the conveying belt 251 by the leading-edge pressurizing roller 249, so that the conveyance direction of the sheet 242 is converted by substantially 90 degrees.

A positive output and a negative output are alternately and repeatedly applied to the charging roller 256, i.e., an alternating voltage is applied to the charging roller 256, so that the conveying belt 251 is charged by an alternating charging voltage pattern. Specifically, the conveying belt 251 is alternately charged by positive and negative outputs in strips of predetermined widths, in the sub scanning direction that corresponds to the rotating direction. When the sheet 242 is fed onto the conveying belt 251 that is alternately charged positively and negatively, the sheet 242 is attracted to the conveying belt 251 and is conveyed in the sub scanning direction as the conveying belt 251 rotates.

The recording heads 234 are driven according to image signals while the carriage 233 is being moved, so that ink droplets are jetted onto a stopping sheet 242 to record one line. Then, the sheet 242 is conveyed by a predetermined amount, and the next line is recorded. When a signal indicating that recording has been finished or a signal indicating that the trailing edge of the sheet 242 has reached the recording area, the recording operation is ended, and the sheet 242 is ejected to the sheet eject tray 203.

Figure 19:
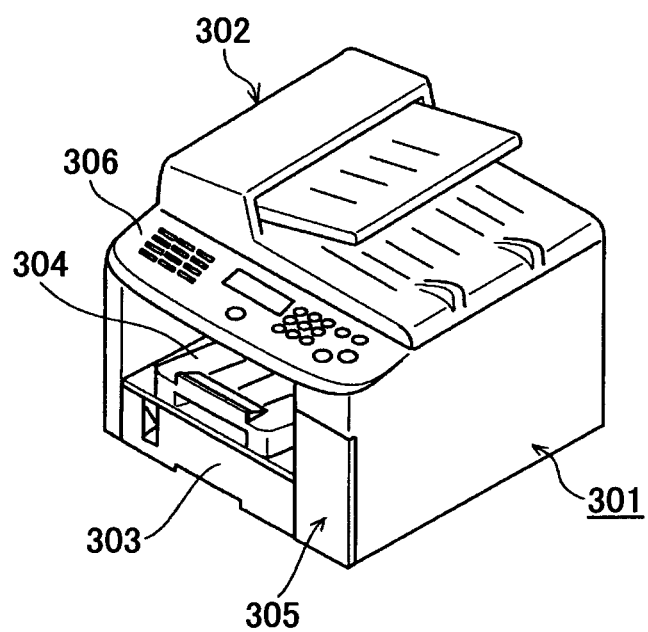
FIG. 19 is an external perspective view of an example of an inkjet multifunction peripheral including the image processing apparatus according to an embodiment of the present invention.

Next, with reference to FIG. 19, a description is given of an inkjet recording apparatus serving as a multifunction peripheral including the image processing apparatus according to an embodiment of the present invention. The FIG. 19 is an external perspective view of the inkjet recording apparatus.

The image forming apparatus (inkjet recording apparatus) includes an image scanning unit (scanner) 302 for scanning images, provided on top of an apparatus main unit 301 for forming images. A sheet feeding cassette 303 for accommodating sheets to be fed to the mechanism part is removably attached to the apparatus main unit 301. A sheet eject tray 304, which is for accommodating ejected sheets having images formed thereon, is attached above the sheet feeding cassette 303. The front side of the apparatus main unit 301 is provided with a cartridge attachment unit 305 for attaching ink cartridges, and an operations/display unit (operations panel) 306 for receiving inputs of various operation signals and for displaying information.

The printing mechanism of the inkjet recording apparatus may be the same as that described with reference to FIGS. 16 and 17, and the control unit of the inkjet recording apparatus may be configured by adding, to the control unit described with reference to FIG. 18, a scanner control unit for controlling the scanner 302. Therefore, no further descriptions are given with respect to these elements.

The inkjet recording apparatus can perform copying operations by scanning an original image with the scanner 302 and printing the image with the printing mechanism.

In the above embodiments, the image forming apparatus generates image data that has undergone the coloring-material usage amount reduction process at the image processing apparatus; however, the image forming apparatus may generate image data that has undergone the coloring-material usage amount reduction process at the image forming apparatus. For example, the present invention is also applicable to an imaging process of an image forming apparatus having multiple functions including an image scanning unit such as a scanner. The present invention is also applicable to an image forming apparatus other than that of an inkjet recording method, such as an electrophotographic method or a thermal transfer method. Furthermore, the present invention is not only applicable to a serial type image forming apparatus but also to a line type image forming apparatus.

In the above embodiments, an LUT is used for the coloring-material usage amount reduction process; however, a conversion equation may be used for performing a consecutive operation.

The present invention is not limited to the specifically disclosed embodiment, and variations and modifications may be made without departing from the scope of the present invention.

The present application is based on Japanese Priority Applications No. 2008-235779 filed on Sep. 13, 2008 and No. 2009-180241 filed on Aug. 1, 2009 with the Japan Patent Office, the entire contents of which are hereby incorporated by reference.

The invention claimed is:

1. An image processing apparatus for converting input image data into output image data for an image forming apparatus configured to output an image with the use of coloring material, the image processing apparatus comprising:
   a processor configured to perform a coloring-material usage amount reduction process of converting the input image data into the output image data such that an amount of the coloring material used for color-printing the input image data becomes a target coloring-material usage amount defined based on a monochrome-printing coloring-material usage amount required for monochrome-printing the input image data.

2. The image processing apparatus according to claim 1, wherein the processor is further configured to perform the coloring-material usage amount reduction process as part of a conversion process of converting RGB values into CMY values.

3. The image processing apparatus according to claim 2, wherein:
   the processor is further configured to perform the conversion process by using a table including color conversion values associated with the RGB values of the input image data, and
   the color conversion value to be used for the conversion process is selected from among the color conversion values in the table, the selected color conversion value corresponding to one color among plural colors having a higher degree of brightness than that of input data indicating the input image data and having the same hue as that of the input data indicating the input image data, the amount of the coloring material used for color-printing said one color being less than or equal to the monochrome-printing coloring-material usage amount corresponding to the input data and also being a maximum amount among the amounts of the coloring materials used for color-printing the plural colors.

4. The image processing apparatus according to claim 1, wherein the processor is further configured to perform the color-material usage amount reduction process so that the target coloring-material usage amount used in the coloring-material usage amount reduction process is different for each color data item.

5. The image processing apparatus according to claim 1, wherein the processor is further configured not to perform the coloring-material usage amount reduction process when the input image data corresponds to at least one of characters and lines.

6. The image processing apparatus according to claim 1, wherein the processor is further configured to perform the color-material usage amount reduction process so that the target coloring-material usage amount is defined based on an object type.

7. The image processing apparatus according to claim 1, wherein the processor is further configured to perform the color-material usage amount reduction process so that the target coloring-material usage amount used in the coloring-material usage amount reduction process is different for each color data item, wherein:
   the target coloring-material usage amount for a predetermined color data item is defined based on the monochrome-printing coloring-material usage amount required for monochrome-printing the input image data; and
   the target coloring-material usage amount for each color data item other than the predetermined color data item is defined so as to range between the monochrome-printing coloring-material usage amount required for monochrome-printing the input image data and a color-printing coloring-material usage amount required for color-printing the input image data.

8. The image processing apparatus according to claim 7, wherein the processor is further configured to perform the color-material usage amount reduction processing for plural copy modes used for copying an original image under different recording conditions, and the target coloring-material usage amount used in the coloring-material usage amount reduction process is defined based on each of the plural copy modes.

9. The image processing apparatus according to claim 7, wherein the processor is further configured to perform the color-material usage amount reduction processing for a double-sided recording mode and a single-sided recording mode, and the target coloring-material usage amount used in the coloring-material usage amount reduction process is defined based on each of the double-sided recording mode and the single-sided recording mode.

10. A printing system, comprising:

the image processing apparatus according to claim 1; and the image forming apparatus configured to output the image with use of the coloring material in accordance with the output image data received from the image processing apparatus.

11. An image processing method for converting input image data into output image data for an image forming apparatus configured to output an image with the use of coloring material, the image processing method comprising:

performing a coloring-material usage amount reduction process of converting the input image data into the output image data such that an amount of the coloring material used for color-printing the input image data becomes a target coloring-material usage amount defined based on a monochrome-printing coloring-material usage amount required for monochrome-printing the input image data.

12. A non-transitory computer-readable recording medium having recorded therein computer executable instructions for causing a computer to execute a process of converting input image data into output image data for an image forming apparatus configured to output an image with the use of coloring material, the process comprising:

performing a coloring-material usage amount reduction process of converting the input image data into the output image data such that an amount of the coloring material used for color-printing the input image data becomes a target coloring-material usage amount defined based on a monochrome-printing coloring-material usage amount required for monochrome-printing the input image data.

* * * * *